(12) United States Patent
Goto et al.

(10) Patent No.: US 7,855,527 B2
(45) Date of Patent: Dec. 21, 2010

(54) INVERTER DEVICE

(75) Inventors: Naomi Goto, Shiga (JP); Yasufumi Kurahashi, Shiga (JP)

(73) Assignee: Panasonic Corporation, Osaka (JP)

( * ) Notice: Subject to any disclaimer, the term of this patent is extended or adjusted under 35 U.S.C. 154(b) by 384 days.

(21) Appl. No.: 12/064,644

(22) PCT Filed: Oct. 16, 2006

(86) PCT No.: PCT/JP2006/320528

§ 371 (c)(1),
(2), (4) Date: Feb. 25, 2008

(87) PCT Pub. No.: WO2007/049473

PCT Pub. Date: May 3, 2007

(65) Prior Publication Data

US 2009/0263260 A1   Oct. 22, 2009

(30) Foreign Application Priority Data

Oct. 24, 2005   (JP)   ............................. 2005-308175
Aug. 4, 2006   (JP)   ............................. 2006-213175

(51) Int. Cl.
*H02P 27/04*   (2006.01)
(52) U.S. Cl. ..................... 318/801; 318/474; 318/139
(58) Field of Classification Search ............... 318/801, 318/474, 139, 400.17, 599, 811, 727, 798; 417/410.1
See application file for complete search history.

(56) References Cited

U.S. PATENT DOCUMENTS

2009/0323232 A1 *  12/2009  Suzuki et al. ................. 361/23

FOREIGN PATENT DOCUMENTS

| JP | 2000-333465 A | 11/2000 |
| JP | 2001-327173 A | 11/2001 |
| JP | 2003-135342 A | 5/2003 |
| JP | 2003-189670 A | 7/2003 |
| JP | 2003-284374 A | 10/2003 |
| JP | 2004-282884 A | 10/2004 |

OTHER PUBLICATIONS

International Search Report for Application No. PCT/JP2006/320528, dated Dec. 12, 2006.

* cited by examiner

*Primary Examiner*—Karen Masih
(74) *Attorney, Agent, or Firm*—RatnerPrestia

(57) ABSTRACT

The inverter device contains the following structure: an inverter circuit which has upper-arm switching elements that are connected on a positive side of a DC power source and lower-arm switching elements that are connected on a negative side of the DC power source; a current sensor that detects current flowing between the DC power source and the inverter circuit; and a control circuit that controls the inverter circuit by a PWM driving so that the inverter circuit outputs AC current to the motor. The control circuit provides a carrier cycle with a first correction and provides the successive cycle with a second correction, by which the current sensor can detect phase current of the motor. A ripple current caused by the first correction and a ripple current caused by the second correction are opposite in polarity.

11 Claims, 24 Drawing Sheets

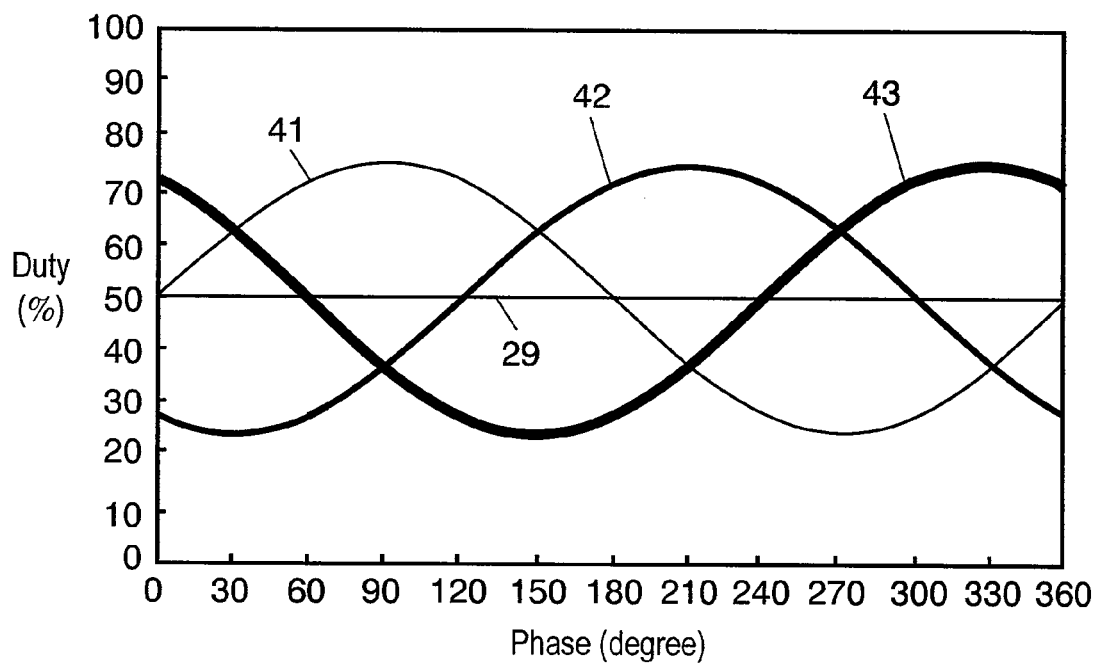
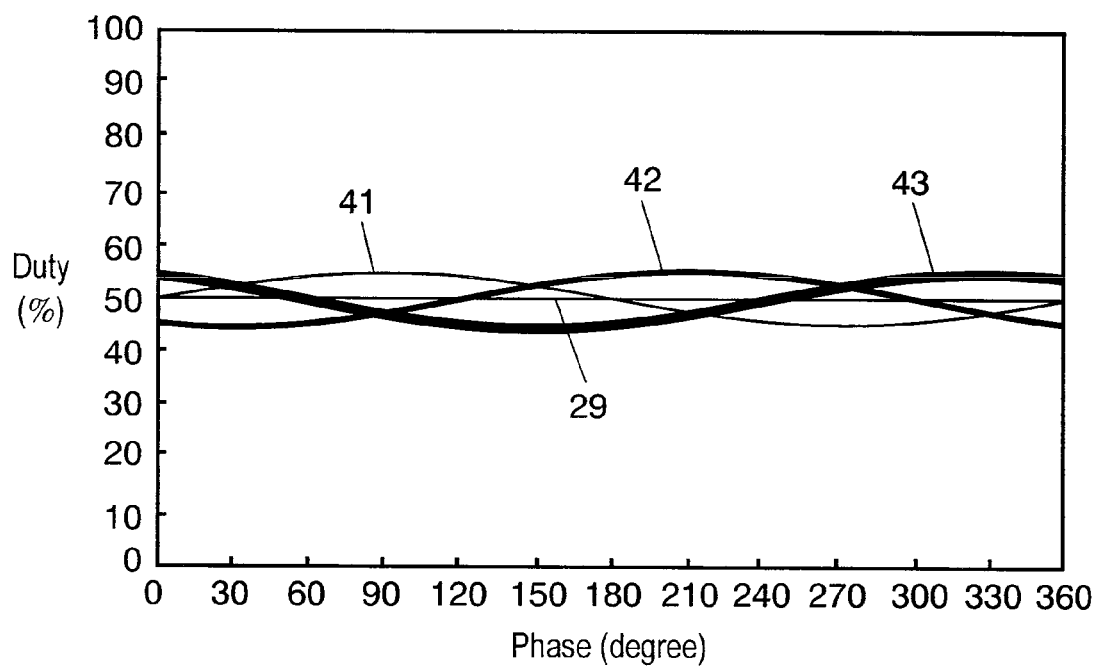

FIG. 12

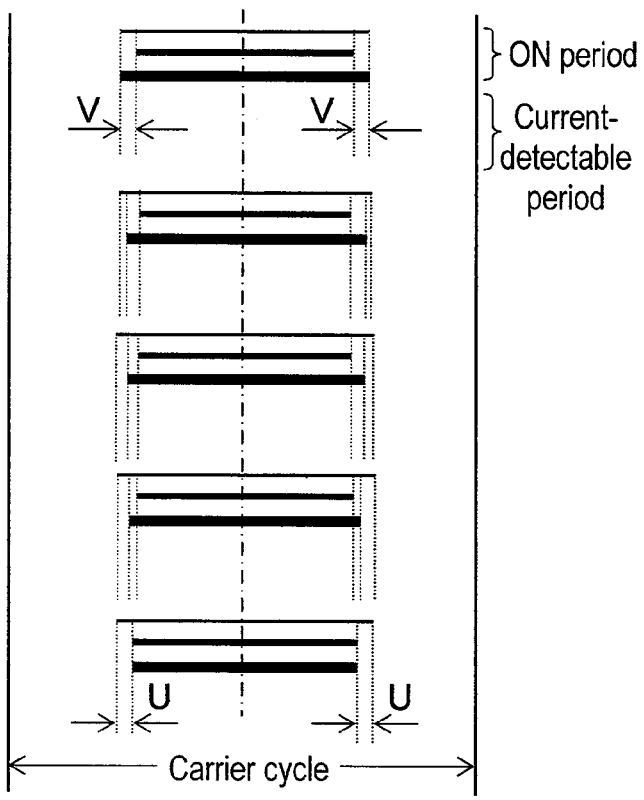

Modulation degree: 10%

Phase: 30° (correction required)
45° (correction required)
60° (correction required)
75° (correction required)
90° (correction required)

ON period
Current-detectable period

Carrier cycle

FIG. 13

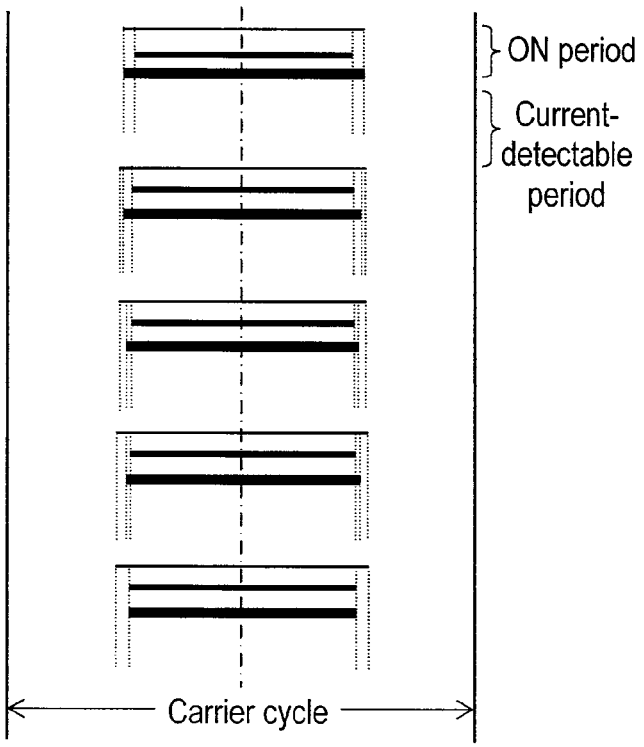

Modulation degree: 5%

Phase: 30° (correction required)
45° (correction required)
60° (correction required)
75° (correction required)
90° (correction required)

ON period
Current-detectable period

Carrier cycle

FIG. 35
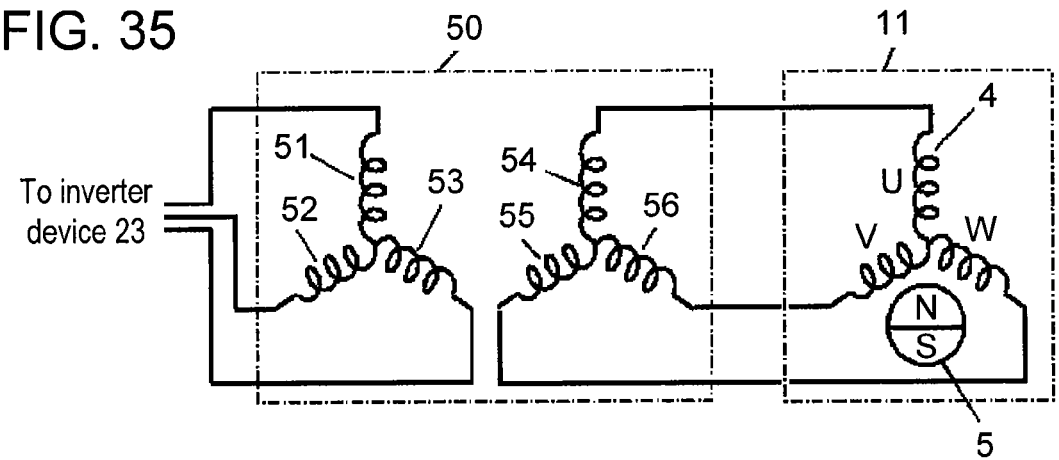
FIG. 36
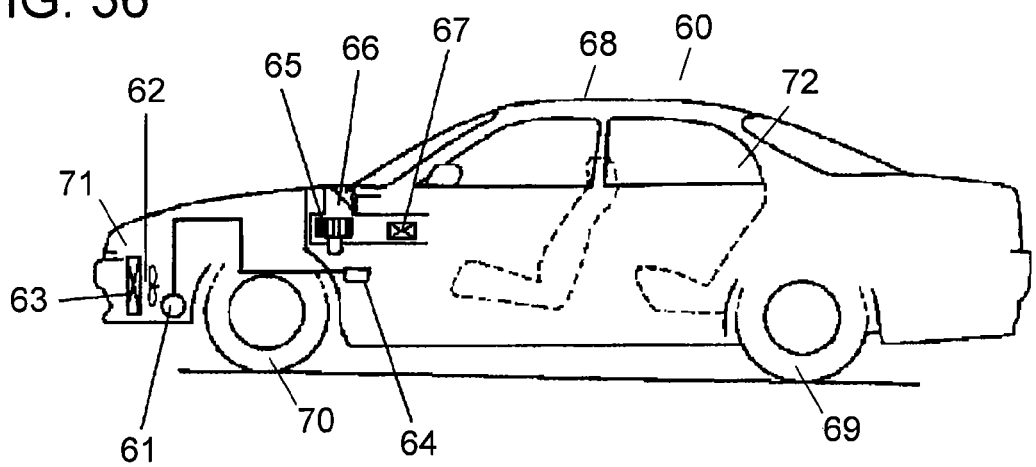
FIG. 37 PRIOR ART
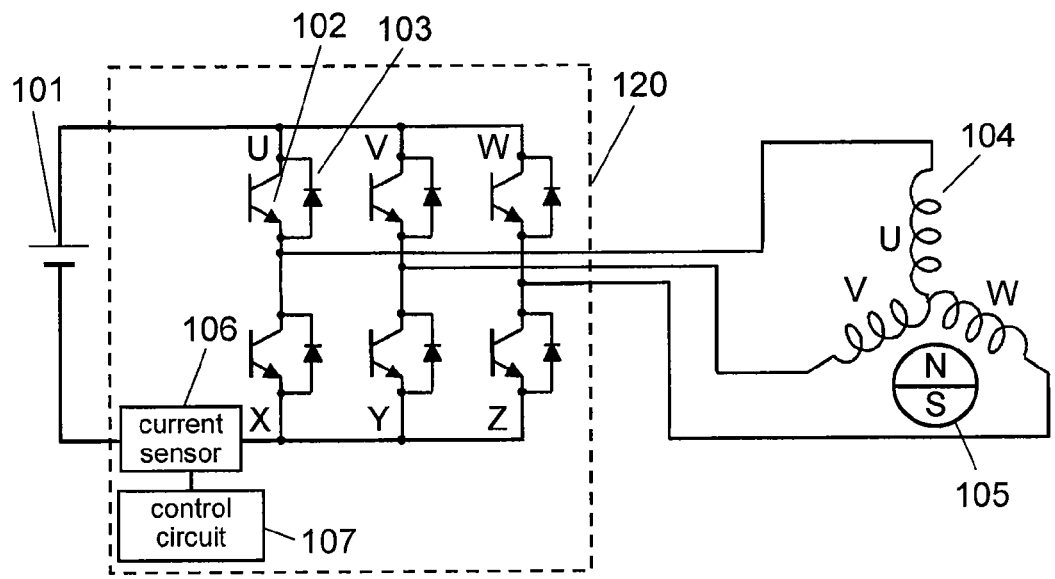

PRIOR ART FIG. 46A     FIG. 46B PRIOR ART
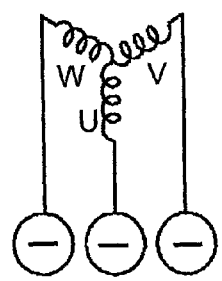 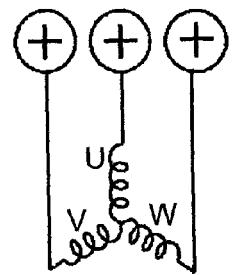
PRIOR ART FIG. 47A     FIG. 47B PRIOR ART
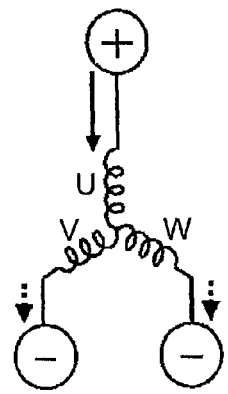 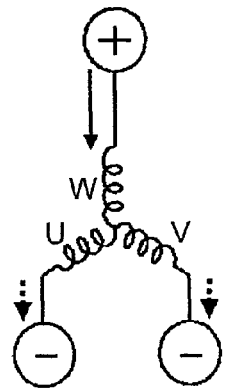
FIG. 48A    FIG. 48B    FIG. 48C
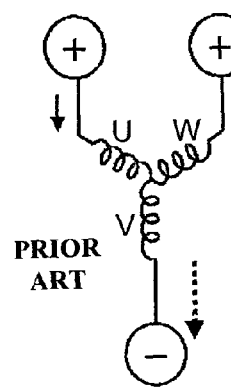 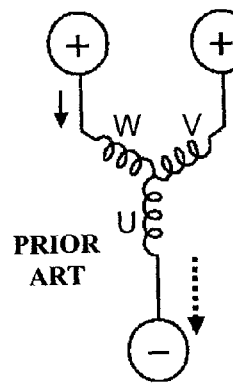 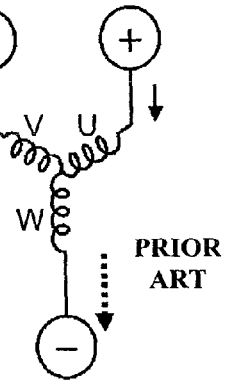
PRIOR ART    PRIOR ART    PRIOR ART

INVERTER DEVICE THIS APPLICATION IS A U.S. NATIONAL PHASE APPLICATION OF PCT INTERNATIONAL APPLICATION PCT/JP2006/320528.

TECHNICAL FIELD

The present invention relates to phase-current detection of an inverter device that operates on a pulse-width modulation (PWM) system.

BACKGROUND ART

For example, Japanese Patent Unexamined Publication No. 2004-282884 discloses a method of detecting phase current from a DC power line, which is a conventionally well-known method.

The conventional structure will be described hereinafter with reference to a circuit diagram shown in FIG. 37. According to a revolution speed instruction signal (not shown) and the like, control circuit 107 of inverter device 120 controls switching elements 102 for converting DC current fed from battery 101 into AC current. The AC current is fed to stator winding 104 of a motor, by which magnet rotor 105 is driven. Diodes 103 form a circulating route of current flowing to stator winding 104. Current sensor 106 detects the current value and sends it to control circuit 107. Control circuit 107 uses the value for calculation of power consumption, judgment for protecting switching elements 102 and positional detection of magnet rotor 105.

Next will be described how current sensor 106 detects phase current on a sign-wave driving. FIG. 38 and FIG. 39 show waveforms (i.e., U-phase terminal voltage 141, V-phase terminal voltage 142, W-phase terminal voltage 143 and neutral-point voltage 129) in three-phase modulation; FIG. 38 shows each waveform in three-phase modulation with a maximum modulation degree of 50%, and FIG. 39 shows the waveforms in the modulation with a maximum modulation degree of 10%. FIG. 40 is a timing chart in one carrier (a carrier cycle), showing an on/off state of upper-arm switching elements U, V, W and lower-arm switching elements X, Y, Z. The timing chart corresponds to the phase of about 120° in three-phase modulation with a maximum modulation degree of 50% shown in FIG. 38. There are four switching patterns (a), (b), (c) and (d). Throughout the patterns, when the upper-arm switching element of a phase is on, the lower-arm switching element of the phase is off, and vice versa. For sake of clarity, FIG. 40 does not show a dead time for preventing short-circuit between the upper-arm switching elements and the lower-arm switching element.

The on/off state of upper-arm switching elements U, V, W tells that which phase of current is detected by current sensor 106. That is, when only one phase is turned on, the current corresponding to the phase flows; when two phases are turned on, the current corresponding to the remaining phase flows; and when all three phases are turned on or off, no current flows. The on/off state of upper-arm switching elements U, V, W tells which phase-current is detectable by current sensor 106. The current detection in this case is successfully carried out on condition that the ON period of an upper-arm switching element is kept longer than a period enough for current detection by current sensor 106.

FIG. 41 shows the ON period (ON duty) of upper-arm switching elements U, V, W in one carrier (a carrier cycle) at phases of 30°, 45°, 60°, 75° and 90° in FIG. 38 (i.e., in the three-phase modulation with a maximum modulation degree of 50%). The ON period of the upper-arm switching elements is evenly shown on the left and right sides from the middle of a carrier cycle. In the figure, a thin solid line represents the ON period of the U-phase; a medium solid line represents the V-phase; and a thick solid line represents the W-phase. In addition, under the ON period, the flowing phase current in the period is indicated by an arrowed solid line with capital letters U and V. Similarly, FIG. 42 shows the ON period of the upper-arm switching elements at each phase in the three-phase modulation with a maximum modulation degree of 10%.

In carrier cycles at phases of 30° and 90° in FIGS. 41 and 42, due to coincidence of the ON periods of two phases of three, current sensor 106 cannot keep time enough for detection. As a result, current sensor 106 detects one phase current only. Similarly, in carrier cycles at phases of 45°, 60° and 75° in FIG. 42, current sensor 106 detects no phase due to lack of time for detection. To detect the position of magnet rotor 105, current sensor 106 has to detect current of at least two phases.

An example below addresses the lack of detecting time. In the PWM system, the ON period can be corrected in a manner that an identical value is added to each phase or subtracted from each phase with no influence on phase voltage. Considering the fact above, the following will be a remedy.

FIG. 43A shows a carrier cycle at a phase of 75° with a maximum modulation degree of 10%. Suppose that, of three-phase ON periods, the maximum ON-period is represented by A; the intermediate ON-period is represented by B; and the minimum ON-period is represented by C. In the figure, α represents half the difference between maximum ON-period A and intermediate ON-period B: α=(A−B)/2; β represents half the difference between intermediate ON-period B and minimum ON-period C: β=(B−C)/2; and δ represents the minimum time enough for current detection of current sensor 106 (where, α+β<δ). In FIG. 43B, the ON period is corrected in a manner that 2δ is added to the maximum ON-period (U-phase) in the end of the period and also added to the intermediate ON-period (W-phase) in the beginning of the period. Furthermore, in FIG. 43C, 2δ is added to the minimum ON-period (V-phase) in a manner that 2δ is evenly shared between the beginning and the end of the period. Through the correction above, in the end of the ON period of the U-phase, the time for detecting current equals δ+α+β (i.e., greater than δ); similarly, in the beginning of the ON period of the W-phase, the time for detecting current equals δ+β (i.e., also greater than δ). This allows current sensor 6 to detect current of the U-phase and the W-phase.

There is no difference in phase current in a carrier cycle between the before-correction and the after-correction; however, in a carrier cycle after correction, a ripple appears in phase current. Here will be detailed the ripple current. FIG. 44 shows U-phase current iU, V-phase current iV and W-phase current iW, which have no correction described in FIG. 43A; on the other hand, FIG. 45 shows each phase current as a result of correction described in FIG. 43C. For sake of clarity, suppose that stator winding 104 of the motor carries inductance L only and resistance R of zero. Besides, for the purpose of obtaining change (ripple) in the phase current in a carrier cycle, the description will be given without consideration of induced voltage that has little change in a carrier cycle.

In FIG. 44, the ON-period having pattern (a) (see FIG. 40), which corresponds to the state shown in FIG. 46A, each phase current has no change. In the period having pattern (b) corresponding to the state shown in FIG. 47A (where, an arrowed solid line shows an increase; an arrowed broken line shows a decrease), U-phase current iU increases, whereas V-phase current and W-phase current decrease; current iU changes twice as much as current iV and iW. In the period, each phase current exhibits a linear change, which follows the equation: E=Ldi/dt (where, L represents inductance of the stator winding; E represents DC voltage; i represents current), and di/dt, which represents the rate of change with time of current i takes a constant in the equation. In the period having pattern (c), which corresponds to the state shown in FIG. 48A, V-phase current iV decreases, whereas U-phase current iU and W-phase current iW increase; current iV changes twice as much as current iU and iW. In the period having pattern (d) corresponding to the state shown in FIG. 46B, each phase current has no change.

In a correction-given carrier cycle shown in FIG. 45, the cycle changes its state in the following order: FIG. 46A, FIG. 47B, FIG. 48B, FIG. 46B, FIG. 48C, FIG. 47A and then FIG. 46A.

In the carrier cycle without correction (FIG. 44), each phase current gradually changes. On the other hand, in the carrier cycle with correction (FIG. 45), U-phase current iU has a temporary decrease before increasing and W-phase current iW has a temporary increase before decreasing. That is, ripple current occurs in the carrier cycle of FIG. 45. In the end of the cycle, U-phase current iU, V-phase current iV and W-phase current iW have a value the same as each phase current in a carrier cycle without correction. That is, increase/decrease in the phase current throughout a carrier cycle with correction has no difference from that in a carrier cycle without correction, and accordingly, there is no influence on the PWM system.

In other correction methods, the aforementioned ripple current repeatedly occurs on a carrier-cycle basis. The ripple current as an electromagnetic force affects the stator winding of the motor, mechanical components and the housing, inviting undesirable noise and vibration. To address the inconveniency, some suggestions have been made. For example, according to the methods disclosed in Japanese Patent Unexamined Publication No. 2003-284374 (see FIG. 1 in page 7) and in Japanese Patent Unexamined Publication No. 2000-333465 (see FIG. 1 in page 8), there is no need for correction on the ON-period for phase-current detection, and no noise and vibration caused by the ripple current. As compared to the methods above, employing a single current-sensor decreases a parts count; and accordingly, contributes to a compact and lightweight structure with high reliability in vibration-proof or the like. The structure detects maximum current passing through the upper-arm and lower-arm switching elements, protecting the switching elements and the diodes connected in parallel from damage. Besides, the current detected by current sensor 106 is DC current fed from battery 101, by which electric power fed from battery 101 can be easily obtained.

SUMMARY OF THE INVENTION

The inverter device of the present invention contains the following structure: an inverter circuit having upper-arm switching elements connected on a positive side of a DC power source and lower-arm switching elements connected on a negative side of the DC power source; a current sensor that detects current flowing between the DC power source and the inverter circuit; and a control circuit that operates the inverter circuit by a PWM driving and outputs AC current to the motor. The control circuit provides a carrier cycle with a first correction and provides the successive cycle with a second correction, by which the current sensor can detect phase current of the motor. A ripple current caused by the first correction and a ripple current caused by the second correction are opposite in polarity.

With the structure above, the inverter circuit of the present invention prevents cyclic occurrence of ripple current having the same polarity and therefore suppresses noise and vibration having high frequencies. The noise and vibration caused by the ripple current in the first correction is cancelled out by the noise and vibration caused by the ripple current in the second correction because of the opposite polarity of the ripple current. Besides, the ripple current, which alternately changes polarity from positive to negative, produces low and smooth frequencies. In this way, employing a single current-sensor allows the inverter device to have a compact and lightweight structure, at the same time, the structure offers highly reliable operation with low noise and vibration.

BRIEF DESCRIPTION OF THE DRAWINGS

FIG. 3 shows modulated waves in each phase in three-phase modulation with a maximum modulation degree of 50% in the inverter device.

FIG. 4 shows modulated waves in each phase in three-phase modulation with a maximum modulation degree of 10% in the inverter device.

FIG. 12 shows a state of the upper-arm switching elements in each phase in the three-phase modulation with a maximum modulation degree of 10%.

FIG. 13 shows a state of the upper-arm switching elements in each phase in the three-phase modulation with a maximum modulation degree of 5%.

FIG. 35 is a circuit diagram showing an input/output isolating transformer and the peripheral structure in accordance with a tenth exemplary embodiment.

FIG. 36 is a schematic diagram of a vehicle employing the inverter device in accordance with an eleventh exemplary embodiment.

FIG. 37 is an electric circuit diagram showing a conventional inverter device for detecting phase current with the use of a current sensor, and the peripheral structure.

FIG. 46A shows a state of phase current when all phases are connected on the negative side.

FIG. 46B shows a state of phase current when all phases are connected on the positive side.

FIG. 47A shows a state of phase current when one phase (U-phase) is connected on the positive side.

FIG. 47B shows a state of phase current when one phase (W-phase) is connected on the positive side.

FIG. 48A shows a state of phase current when two phases (U-phase and W-phase) are connected on the positive side.

FIG. 48B shows a state of phase current when two phases (W-phase and V-phase) are connected on the positive side.

FIG. 48C shows a state of phase current when two phases (V-phase and U-phase) are connected on the positive side.

DETAILED DESCRIPTION OF THE PREFERRED EMBODIMENTS

The embodiments of the present invention are described hereinafter with reference to the accompanying drawings.

First Exemplary Embodiment

Figure 1:
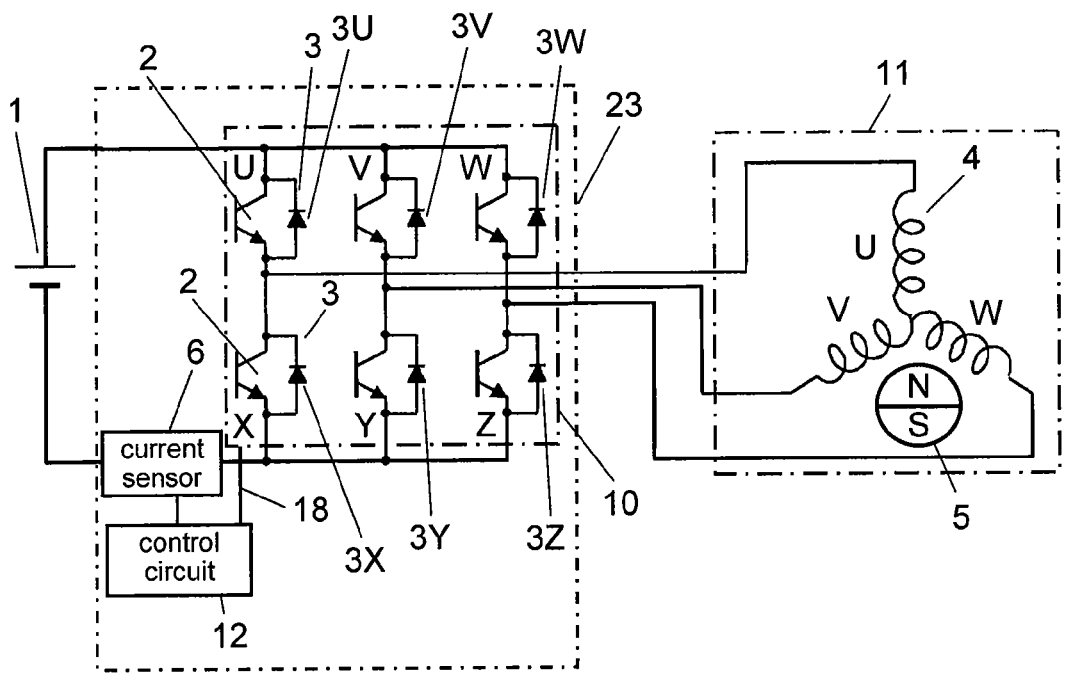
FIG. 1 is an electric circuit diagram showing an inverter device and the peripheral structure in accordance with a first exemplary embodiment of the present invention.

FIG. 1 is an electric circuit diagram showing an inverter device and the peripheral structure in accordance with the first exemplary embodiment of the present invention. Receiving voltage from current sensor 6 disposed on a power source line, control circuit 12 of inverter device 23 detects phase current. Control circuit 12 detects current in two phases and calculates the current value of the rest of the three phases from the detected two current values. In the calculation, Kirchhoff's law is applied to a neutral point of stator winding 4.

Using the three current values, control circuit 12 detects the position of magnet rotor 5 that constitutes sensorless DC brushless motor 11 (hereinafter, motor 11) by calculating induced voltage of stator winding 4. According to a revolution speed instruction signal (not shown) and the like, control circuit 12 controls switching elements 2 of inverter circuit 10 so that DC voltage from battery 1 is switched by PWM driving. Through the modulation, sinusoidal wave-shaped AC current is fed to stator winding 4. Diodes 3 of inverter circuit 10 form a route of current flowing to stator winding 4. For convenience's sake, explanations will be given hereinafter on the understanding that switching elements 2 are formed of upper-arm switching elements U, V, W and lower-arm switching elements X, Y, Z, and switching elements U, V, W, X, Y and Z correspond to diodes 3U, 3V, 3W, 3X, 3Y and 3Z, respectively.

Current sensor 6 should be a structure capable of detecting instantaneous peak current, such as a current sensor employing a Hall element, a shunt resistor. Current sensor 6 can be disposed on the positive side of the power source line. Employing a shunt resistor is advantageous to form the inverter device to have a compact and vibration-proof structure.

Control circuit 12 is connected to upper-arm switching elements U, V, W and lower-arm switching elements X, Y, Z via connection line 18. When switching elements 2 are formed of an IGBT or a power MOSFET, control circuit 12 controls gate voltage; when they are formed of a power transistor, control circuit 12 controls base current.

Induced voltage is obtained from the following calculation. Stator winding 4 carries inductance L and resistance R. The sum of induced voltage, the voltage on inductance L and the voltage on resistance R equal to application voltage fed from inverter device 23. That is, $V=E+R \cdot i+L \cdot di/dt$ (where, E represents induced voltage; i represents phase current; V represents application voltage.) Induced voltage E is therefore expressed as follows: $E=V-R \cdot i-L \cdot di/dt$. Control circuit 12 controls switching elements 2, and therefore, application voltage V is a known value. That is, when phase current i is detected, induced voltage E can be calculated by setting the values of inductance L and resistance R into the calculation program of control circuit 12.

Figure 2:
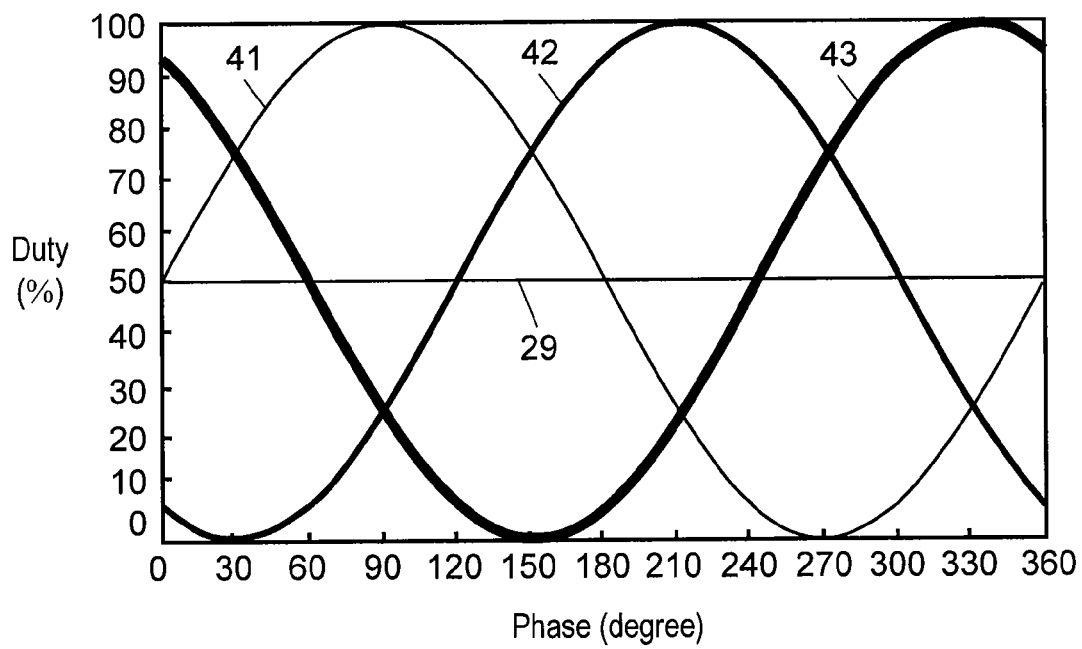
FIG. 2 shows modulated waves in each phase in three-phase modulation with a maximum modulation degree of 100% in the inverter device.

Next will be described phase-current detection by current sensor 6. FIGS. 2, 3 and 4 show waveforms of each phase (i.e., U-phase terminal voltage 41, V-phase terminal voltage 42, W-phase terminal voltage 43 and neutral-point voltage 29) in three-phase modulation; specifically, FIG. 2 shows three-phase modulation with a maximum modulation degree of 100%, FIG. 3 shows the modulation with a maximum modulation degree of 50% and FIG. 4 shows the modulation with a maximum modulation degree of 10%. In the three-phase modulation, the amplitude of a waveform increases in the directions of 0% and 100% as the degree of modulation increases.

Figure 5:
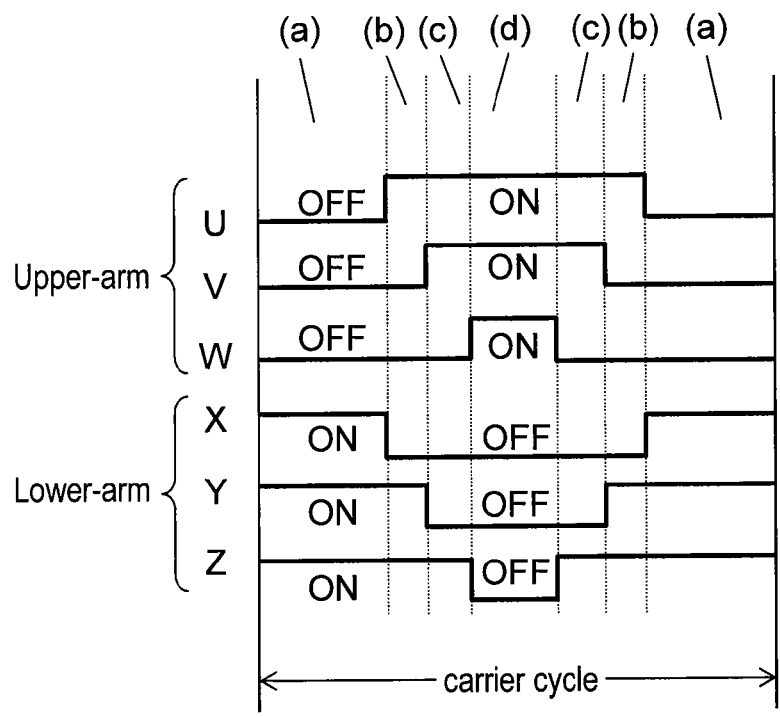
FIG. 5 is a timing chart illustrating phase-current detection of the inverter device.

FIG. 5 is a timing chart of three-phase modulation in one carrier (carrier cycle), showing an on/off state of upper-arm switching elements U, V, W and lower-arm switching elements X, Y, Z. This is practically obtained by a timer function of a microcomputer. The timing chart corresponds to the phase of about 120° in three-phase modulation with a maximum modulation degree of 50% shown in FIG. 3. There are four patterns (a), (b), (c) and (d).

Figure 6:
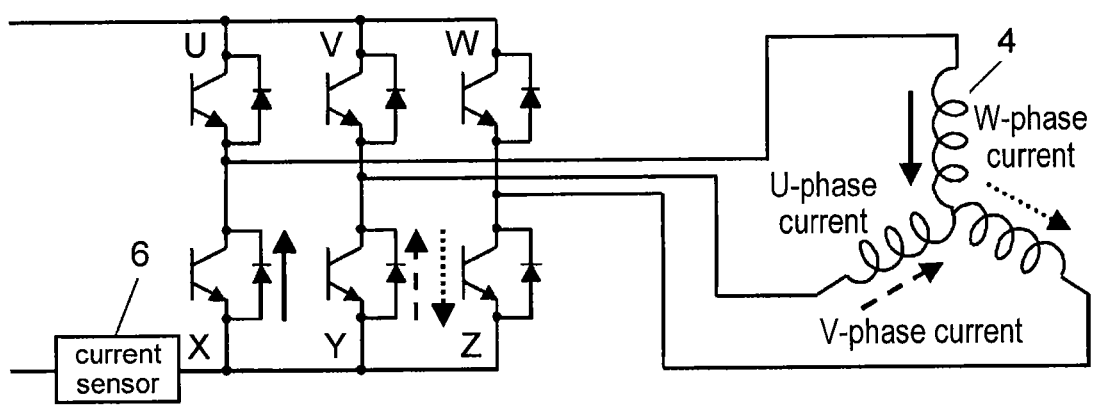
FIG. 6 is an electric circuit diagram showing the current path of pattern (a) in the inverter device.

In the period of pattern (a), all of upper-arm switching elements U, V, W are turned off, and all of lower-arm switching elements X, Y, Z are turned on. FIG. 6 shows a current flow in this state. The U-phase current and the V-phase current flow from the diodes 3X, 3Y disposed parallel to lower-arm switching elements X and Y, respectively, to stator winding 4. The W-phase current flows from stator winding 4 to lower-arm switching element Z. Therefore, current sensor 6 carries no current and therefore current is not detected.

Figure 7:
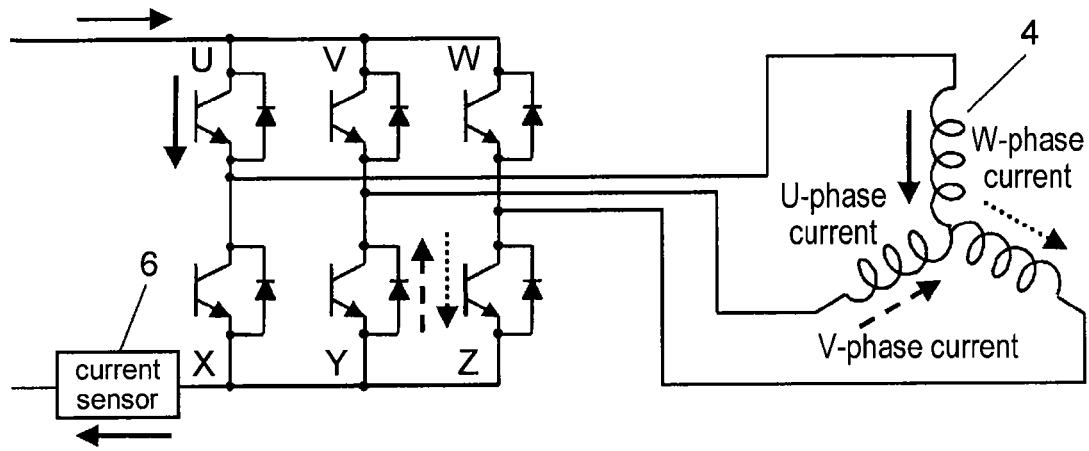
FIG. 7 is an electric circuit diagram showing the current path of pattern (b) in the inverter device.

In the period of pattern (b), upper-arm switching element U and lower-arm switching elements Y, Z are turned on. FIG. 7 shows a current flow in this state. In this period, the U-phase current flows from upper-arm switching element U to stator winding 4; the V-phase current flows from diode 3Y disposed parallel to lower-arm switching element Y to stator winding 4; and the W-phase current flows from stator winding 4 to lower-arm switching element Z. That is, current sensor 6 detects the U-phase current.

Figure 8:
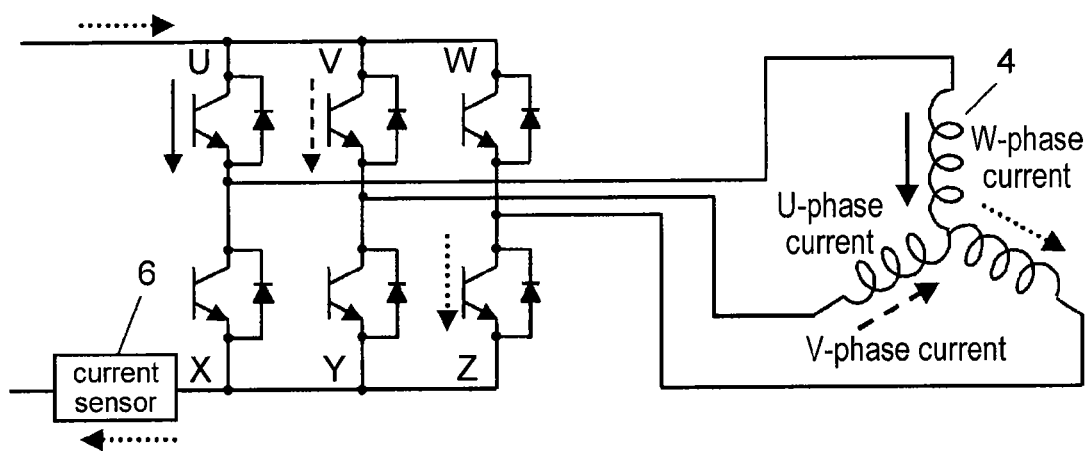
FIG. 8 is an electric circuit diagram showing the current path of pattern (c) in the inverter device.

In the period of pattern (c), upper-arm switching elements U, V and lower-arm switching elements Z are turned on. FIG. 8 shows a current flow in this state. In this period, the U-phase current and the V-phase current flow from upper-arm switching elements U and V, respectively, to stator winding 4; and the W-phase current flows from stator winding 4 to lower-arm switching element Z. That is, current sensor 6 detects the W-phase current.

Figure 9:
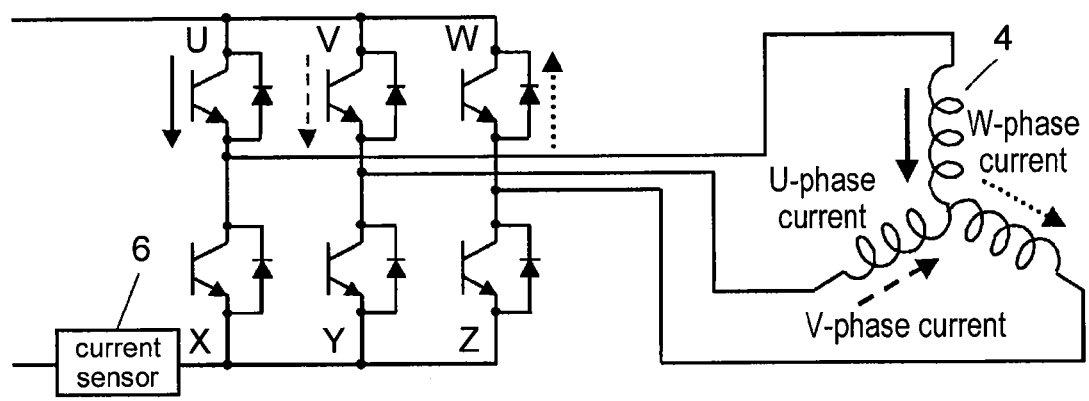
FIG. 9 is an electric circuit diagram showing the current path of pattern (d) in the inverter device.

In the period of pattern (d), all of upper-arm switching elements U, V, W are turned on, and all of lower-arm switching elements X, Y, Z are turned off. FIG. 9 shows a current flow in this state. The U-phase current and the V-phase current flow from upper-arm switching elements U and V, respectively, to stator winding 4. The W-phase current flows from stator winding 4 to diode 3W disposed parallel to upper-arm switching element W. That is, current sensor 6 carries no current and therefore current is not detected.

Current sensor 6, as described above, detects the U-phase and the W-phase current. The V-phase current can be obtained by applying Kirchhoff's law at a neutral point of stator winding 4. The U-phase current flows into the neutral point of stator winding 4, whereas the W-phase current flows out of the neutral point of stator winding 4. The V-phase current is obtained as a difference between the U-phase current and the W-phase current. The on/off state of upper-arm switching elements U, V, W tells that which phase-current is detectable by current sensor 6. That is, when only one phase is turned on, the current corresponding to the phase flows; when two phases are turned on, the current corresponding to the remaining phase flows; and when all three phases are turned on or off, no current flows. Therefore, the ON-period of upper-arm switching elements U, V, W tells that which phase-current is detectable by current sensor 6.

Figure 10:
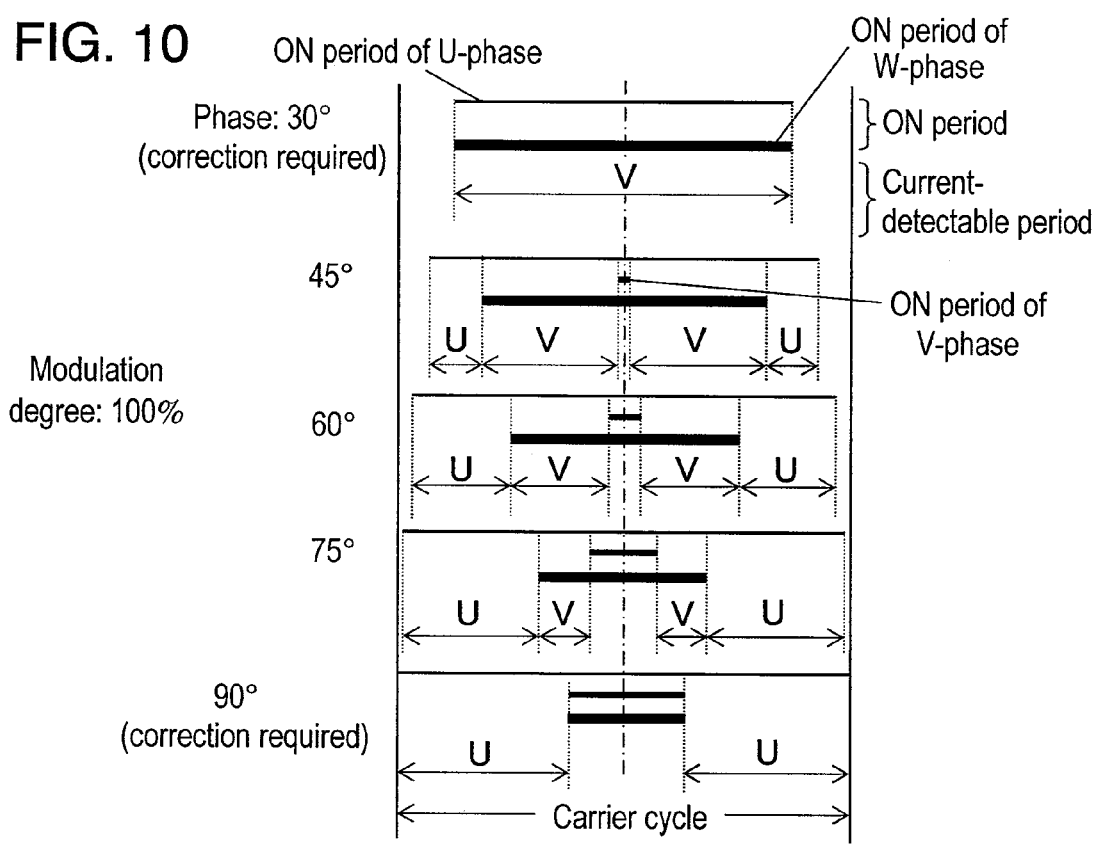
FIG. 10 shows a state of the upper-arm switching elements in each phase in the three-phase modulation with a maximum modulation degree of 100%.

FIG. 10 shows the ON period of upper-arm switching elements U, V, W in one carrier (a carrier cycle) at phases of 30°, 45°, 60°, 75° and 90° in FIG. 2 (i.e., in three-phase modulation with a maximum modulation degree of 100%). The ON period (ON duty) of the upper-arm switching elements is evenly shown on the left and the right sides from the middle of a carrier cycle. The ON duty corresponds to the graph shown in FIG. 2. In FIG. 10, a thin solid line represents the ON period of the U-phase; a medium solid line represents the V-phase; and a thick solid line represents the W-phase. In addition, under the ON period, the current-detectable period for the U-phase and V-phase is indicated by capital letters of U and V. When the W-phase current is detected in other phase, letter W is shown under the ON period.

For example, at a phase of 30° in FIG. 2, both the U-phase and the W-phase undergo a modulation degree of 75%. Returning to FIG. 10, the ON period with a modulation degree of 75% is evenly shown—a thin solid line represents the U-phase and a thick solid line represents the W-phase—on the left and the right from the middle of a carrier cycle as 100%. Other phases are similarly shown. The phases of 30° to 90° are given as an example here because the ON-period pattern of 30° to 90° is repeated over the phases. Similarly, FIGS. 11 through 13 show the ON period of each phase—with a maximum modulation degree of 50% (FIG. 11), degree of 10% (FIG. 12), and degree of 5% (FIG. 13).

Figure 11:
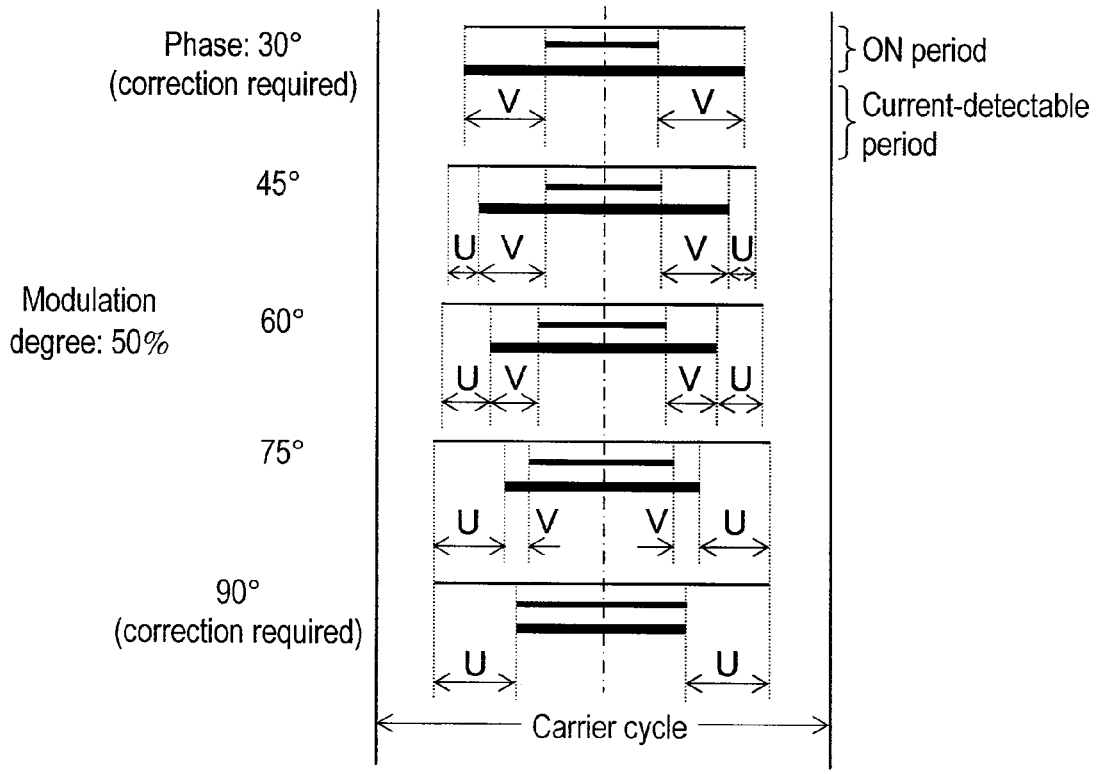
FIG. 11 shows a state of the upper-arm switching elements in each phase in the three-phase modulation with a maximum modulation degree of 50%.

As for the phases of 30° and 90° in FIG. 10 through FIG. 12, current sensor 6 cannot keep a time required for detection because of coincidences of the ON period of two phases, so that current sensor 6 detects only one phase. In addition, as for the phases of 45°, 60°, 75° in FIG. 12 and all the phases in FIG. 13, current sensor 6 fails current detection due to lack of detecting time.

FIG. 14 shows an example that copes with the inconvenience above. In the PWM system, the ON period can be corrected in a manner that an identical value is added to each phase or subtracted from each phase with no influence on phase voltage. Considering the fact above, the following will be a remedy.

Figure 14A:
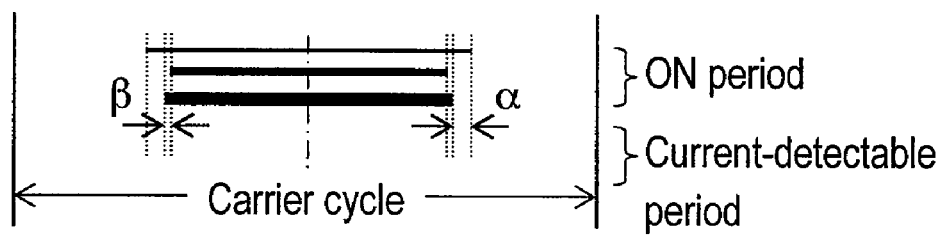
FIG. 14A illustrates phase-current detection in a phase of 75° in the three-phase modulation with a maximum modulation degree of 10%
Figure 14B:
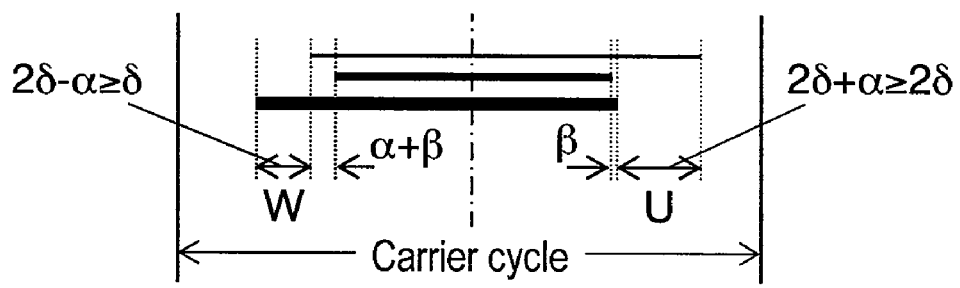
FIG. 14B shows a state as a result of correction applied to the state of FIG. 14A.

FIG. 14A shows a carrier cycle at a phase of 75° with a maximum modulation degree of 10% (i.e., picked out from FIG. 12). Suppose that, of three-phase ON periods, the maximum ON-period is represented by A; the intermediate ON-period is represented by B; and the minimum ON-period is represented by C. In the figure, $\alpha$ represents half the difference between maximum ON-period A and intermediate ON-period B: $\alpha=(A-B)/2$; $\beta$ represents half the difference between intermediate ON-period B and minimum ON-period C: $\beta=(B-C)/2$; and $\delta$ represents the minimum time enough for current detection of current sensor 6 (where, $\alpha+\beta<\delta$). In FIG. 14B, the ON period is corrected in a manner that $2\delta$ is added to the maximum ON-period (U-phase) in the end of the period and also added to the intermediate ON-period (W-phase) in the beginning of the period. Furthermore, in FIG. 14C, $2\delta$ is added to the minimum ON-period (V-phase) in a manner that $2\delta$ is evenly shared between the beginning and the end of the period. Through the correction above, in the end of the ON period of the U-phase, the time for detecting current equals $\delta+\alpha+\beta$ (i.e., greater than $\delta$); similarly, in the beginning of the ON period of the W-phase, the time for detecting current equals $\delta+\beta$ (i.e., also greater than $\delta$). This allows current sensor 6 to detect current of the U-phase and the W-phase.

The correction above, however, brings the following problem. Although there is no difference in phase current in a carrier cycle between the before-correction and the after-correction, in a carrier cycle after correction, a ripple appears in phase current.

Figure 14C:
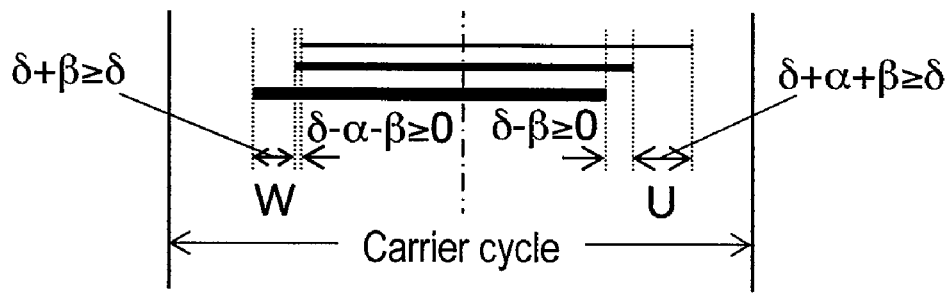
FIG. 14C shows a state as a result of correction applied to the state of FIG. 14A.
Figure 15:
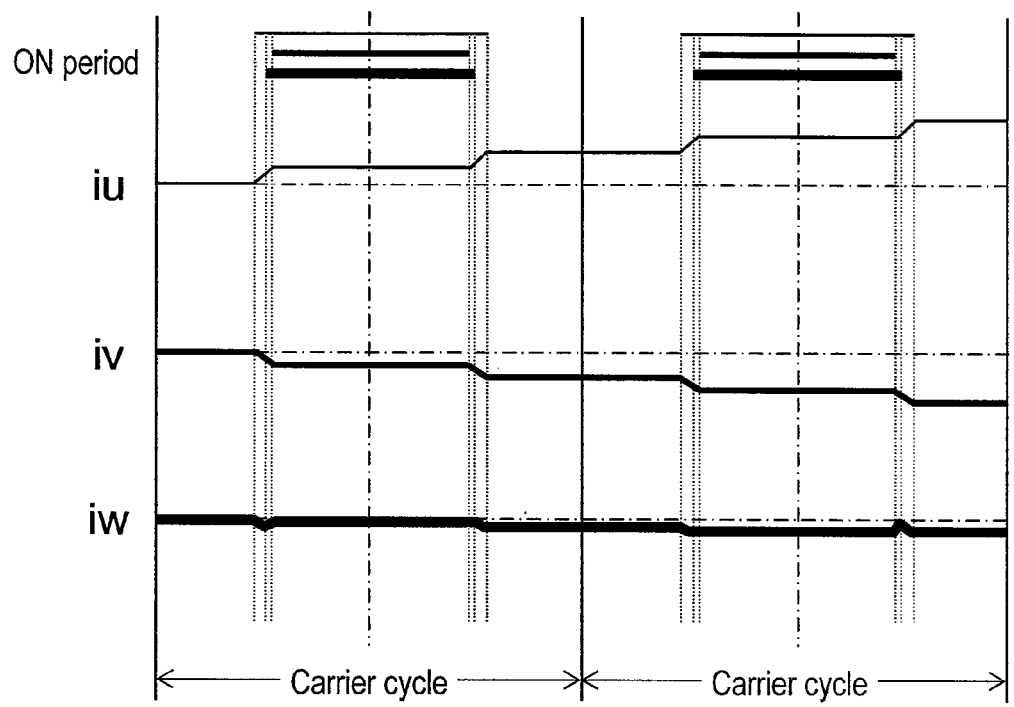
FIG. 15 shows behavior of each phase current over two carrier cycles having no correction for current detection.
Figure 16:
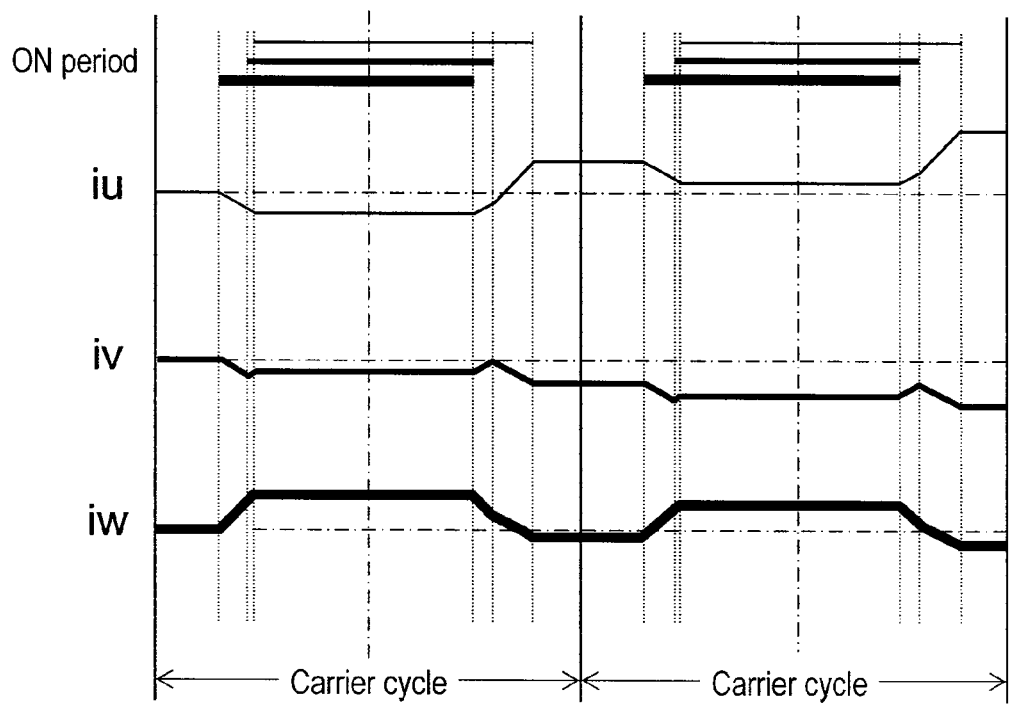
FIG. 16 shows behavior of each phase current over two carrier cycles having correction for phase-current detection.

FIG. 15 shows U-phase current iU, V-phase current iV and W-phase current iW over two carrier cycles having no correction (as is shown in FIG. 14A). The two carrier cycles exhibit a small change in phase and have the same ON period (ON duty). FIG. 16 shows the ON period of each phase current over two carrier cycles to which correction is applied (as is shown in FIG. 14C). Like in FIG. 15, the U-phase current, the V-phase current and the W-phase current are represented by iU, iV and iW, respectively.

As is apparent from the figures, in the carrier cycle without correction (FIG. 15), each phase current gradually changes. On the other hand, in the carrier cycle with correction (FIG. 16), U-phase current iU has a temporary decrease before increasing and W-phase current iW has a temporary increase before decreasing. The temporary increase and decrease is called as a ripple that can cause an undesirable effect in the modulation. A downward (hereinafter, negative-going) ripple appears in U-phase current iU and an upward (hereinafter, positive-going) ripple appears in W-phase current iW. In the end of the cycle, U-phase current iU, V-phase current iV and W-phase current iW have a value the same as each phase current in a carrier cycle without correction. That is, increase/decrease in the phase current throughout a carrier cycle with correction has no difference from that in a carrier cycle without correction, and accordingly, there is no influence on the PWM system. (This means that there is no change in phase voltage and phase current in a carrier cycle.)

When the ON period is corrected, for example, by adding an amount of time to the ON period so that the current sensor can keep time $\delta$ at least required to detect current, the added time should be subtracted from the ON period so as not to affect the PWM operation. As is in the correction in FIG. 14, it is inevitable that ripple current occurs in a correction process. The ripple current can produce ill effect on the mechanical components and the housing of the motor: vibration or resonance by the ripple current can cause undesired noise and vibration. FIG. 16 shows that each phase current undergoes a ripple that repeatedly appears in the same direction by carrier cycle, which causes vibration in the same direction, i.e., noise and vibration in carrier frequencies.

Figure 17:
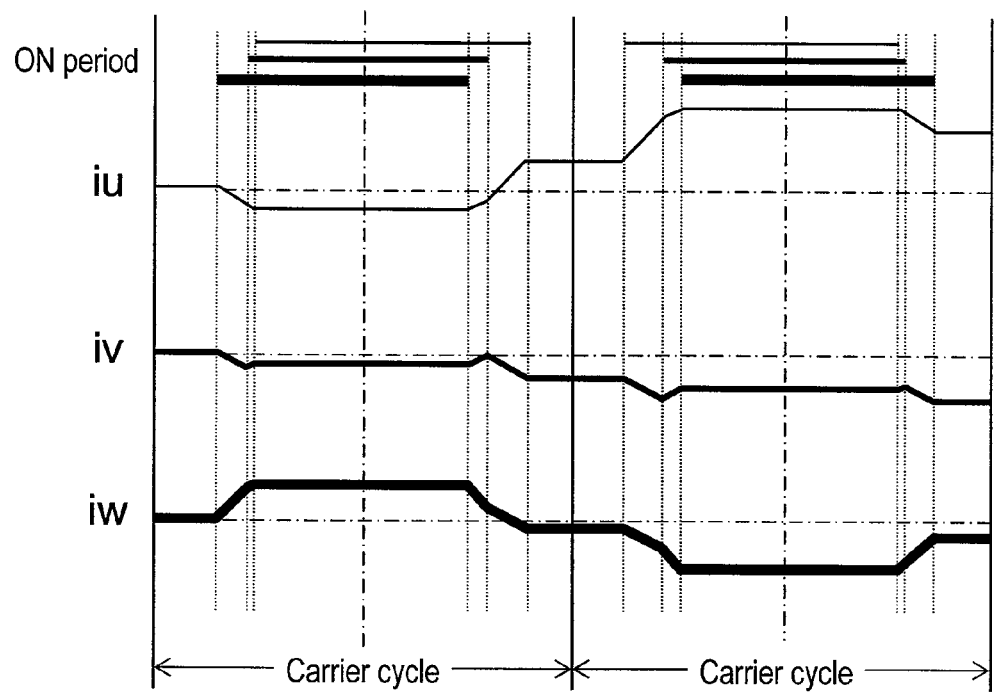
FIG. 17 shows improved behavior of each phase current over two carrier cycles having correction for phase-current detection.

Here will be described the method of the present invention capable of suppressing the noise and vibration above. FIG. 17 shows improved behavior of each phase current after correction is applied to the ON-period in accordance with the first exemplary embodiment. Of the two successive carrier cycles, the left-side cycle undergoes a first correction and the right-side cycle undergoes a second correction. The correction is provided on a cycle basis. As for the correction applied to the left side cycle, there is no difference in behavior of phase current from that in a conventional correction shown in FIG. 16; a negative-going ripple appears in U-phase current iU and a positive-going ripple appears in W-phase current iW.

On the other hand, the right-side carrier cycle of FIG. 17 is so formed that the cycle of FIG. 16 is reversed left to right at the center. U-phase current iU exhibits a steep rise in its increase, whereas W-phase current iW exhibits a steep fall in its decrease. The ripple current appears, as shown in the figure, opposite in direction to the left-side carrier cycle; a positive-going ripple appears in U-phase current iU and a negative-going ripple appears in W-phase current iW. That is, there is no repeat occurrence of ripple current in the same direction by carrier cycle, and accordingly, noise and vibration in carrier frequencies can be eliminated. As a result, operations with low noise and vibration are obtained.

In FIGS. 16 and 17, changes in phase current is due to not only the ripple current but also the PWM driving itself. It is therefore difficult to clearly show the behavior of the ripple current. To focus on the ripple current produced by correction, hereinafter, the description will be given on the correction on the ON period without the PWM driving.

Figure 18:
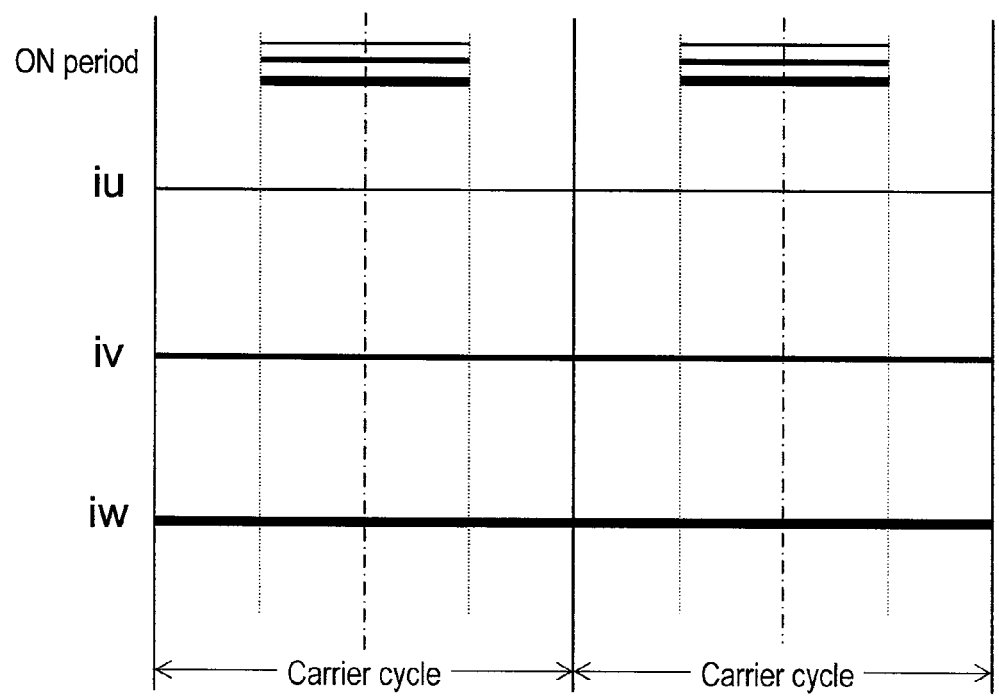
FIG. 18 shows ripple current over two carrier cycles under the condition that PWM is not provided.

FIG. 18 shows the state of each phase current without the PWM driving. U-phase current iU, V-phase current iV and W-phase current iW have no change. It will be understood that the state with a maximum modulation degree of 5% (FIG. 13) is almost the same as the state of FIG. 18.

Figure 19:
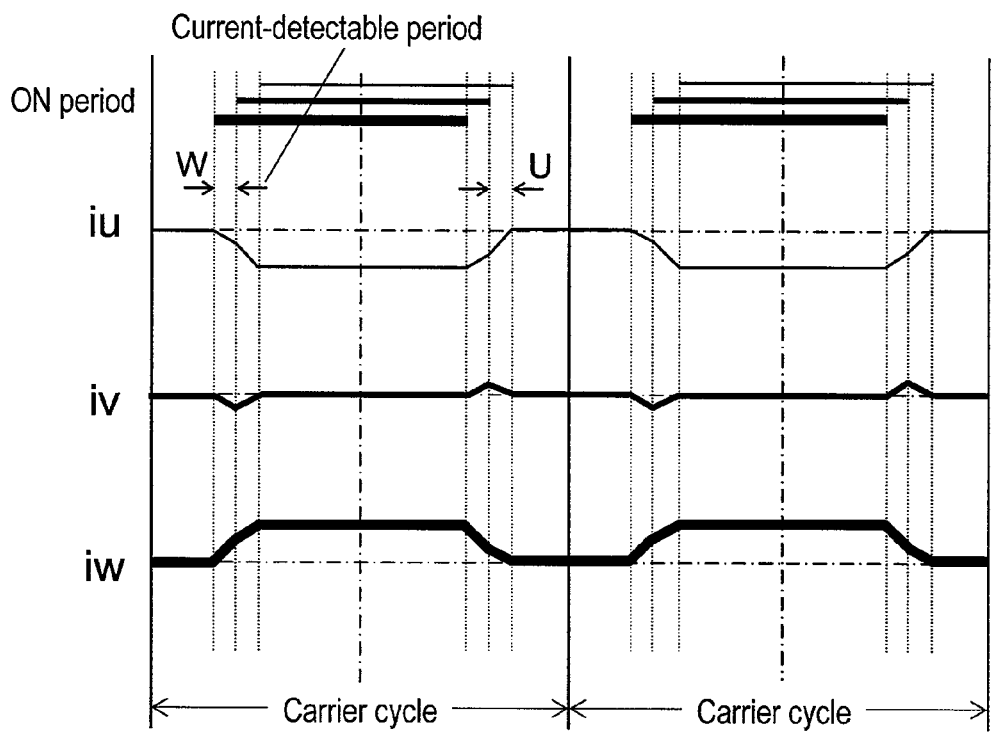
FIG. 19 shows behavior of ripple current over two carrier cycles having correction for current detection under the condition that PWM is not provided.

FIG. 19 shows the state in which the correction described in FIG. 14 is applied to the ON period shown in FIG. 18. The correction allows current sensor 6 to have minimum time $\delta$ just enough for current detection, so that W-phase current iW and U-phase current iU are detectable. The state of FIG. 19 is the same as the case where $\alpha$ and $\beta$ equal zero in FIG. 14. Like in FIG. 16, a negative-going ripple appears in U-phase current iU and a positive-going ripple appears in W-phase current iW. In the end of the cycle, U-phase current iU, V-phase current IV and W-phase current iW have a value the same as each phase current in a carrier cycle without correction. That is, increase/decrease in the phase current throughout a carrier cycle with correction has no difference from that in a carrier cycle without correction, and accordingly, there is no influence on the PWM system. The repeat occurrence of ripple current in the same direction by carrier cycle produces vibration in the same direction by carrier cycle, and accordingly, produces noise and vibration in carrier frequencies. There is no ripple in the opposite direction to cancel out the previously appeared ripple. As a result, the operation produces distorted and harsh noise.

Figure 20:
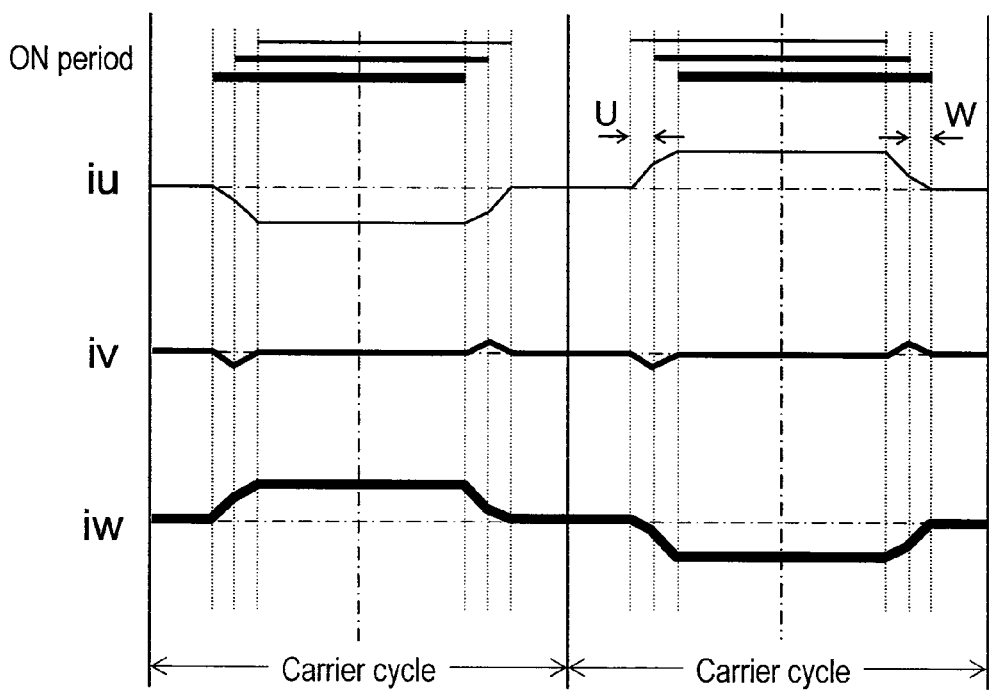
FIG. 20 shows improved behavior of the ripple current over two carrier cycles having correction for current detection under the condition that PWM is not provided.

FIG. 20 shows an example having an improvement in correction shown in FIG. 19. Of the two successive carrier cycles, the left-side cycle undergoes a first correction and the right-side cycle undergoes a second correction. As for the correction applied to the left side cycle, there is no difference in behavior of phase current from that in the correction shown in FIG. 19; a negative-going ripple appears in U-phase current iU and a positive-going ripple appears in W-phase current iW. The right-side carrier cycle of FIG. 20 is so formed that the cycle of FIG. 19 is reversed left to right at the center. In this case, as is shown in the figure, the ripple current behaves opposite to the left-side carrier cycle; a positive-going ripple appears in U-phase current iU and a negative-going ripple appears in W-phase current iW. Ripple current in the same polarity appears by two carrier cycles, reducing the frequency one-half.

In the correction above, repeat occurrence of ripple current in the same direction by carrier cycle, as is observed in FIG. 19, is eliminated. The smooth behavior of ripple current keeps a pattern where the occurrence direction varies by carrier cycle, reducing the frequency one-half, and accordingly, reducing the grating noise. In U-phase current iU, the noise and vibration, which is caused by negative-going ripple current in the left-side carrier cycle, is cancelled out by the noise and vibration caused by positive-going ripple current in the right-side carrier cycle. This eliminates noise and vibration in carrier frequencies, thereby providing smooth operations without noise and vibration.

The right-side carrier cycle of FIG. 20 is so formed that the cycle of FIG. 19 is reversed left to right at the center. In this case, the U-phase current is detected in the beginning of the right-side carrier cycle (i.e., as is seen on the left side of the cycle) and the W-phase current is detected in the end of the cycle (i.e., on the right side). Although the phase-current detection is opposite to that obtained in FIG. 19, there is no difference in that current in two phases is detectable.

Second Exemplary Embodiment

Figure 21:
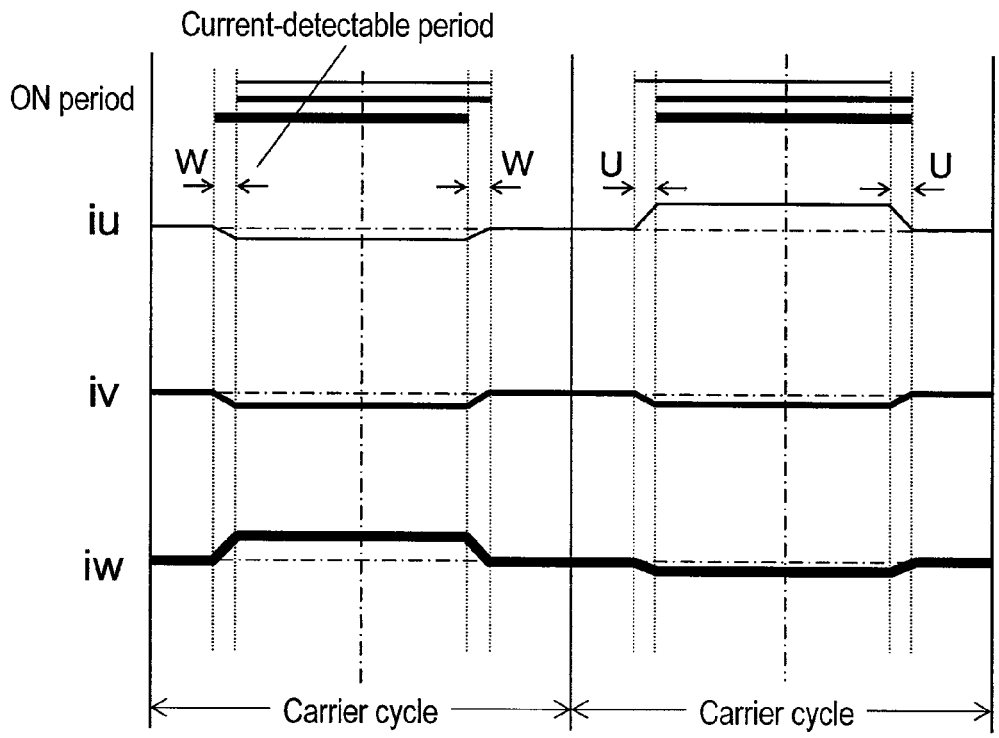
FIG. 21 shows behavior of ripple current when current in two phases is detected on the two-carrier-cycle basis in accordance with a second exemplary embodiment.

The structure of the second exemplary embodiment will be described with reference to FIGS. 21 through 24. FIG. 21 shows behavior of each phase current in a case where a first correction is applied to the carrier cycle on the left and a second correction is applied to the carrier cycle on the right. The left-side carrier cycle is corrected in a manner that 2δ is added to the beginning of the ON period of the W-phase in FIG. 18 and 2δ is also added to the U-phase and the V-phase so as to be evenly shared between the beginning and the end of the ON period. The correction allows the current sensor to have time δ for detecting the W-phase current in the beginning and the end of the ON period, so that the W-phase current is detectable. In the left-side carrier cycle, a negative-going ripple appears in U-phase current iU and V-phase current iV, whereas a positive-going ripple appears in W-phase current iW.

On the other hand, the right-side carrier cycle is corrected in a manner that 2δ is added to the beginning of the ON period of the U-phase in FIG. 18 and 2δ is also added to the V-phase and the W-phase so as to be evenly shared between the beginning and the end of the ON period. The correction allows the current sensor to have time δ for detecting the U-phase current in the beginning and the end of the ON period, so that the U-phase current is detectable. In the right-side carrier cycle, a positive-going ripple appears in U-phase current iU, whereas a negative-going ripple appears in V-phase current iV and W-phase current iW The correction above allows the current sensor to detect current in two different phases on the two-carrier-cycle basis. As is the case in FIG. 20, the ripple current of the U-phase and the W-phase in the left-side carrier cycle oppositely in direction occurs in the right-side carrier cycle. Besides, change in the ripple current of the U-phase and the W-phase is smaller than that of FIG. 20. This further contributes to smooth operations with low noise and vibration.

Figure 22:
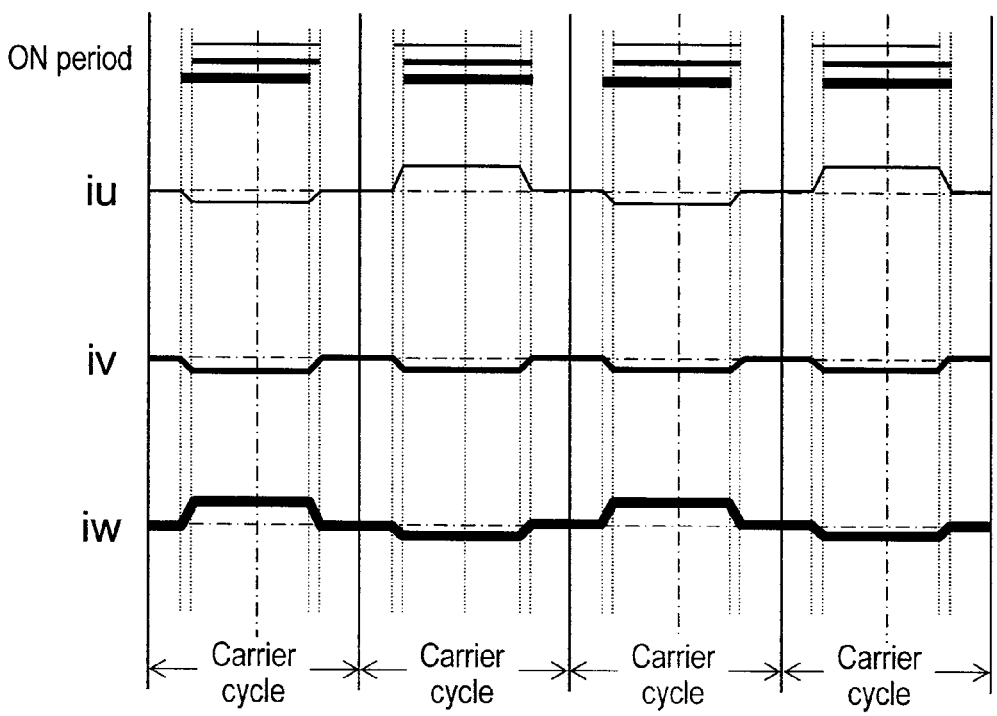
FIG. 22 shows behavior of ripple current over four carrier cycles when current in two phases is detected on the two-carrier-cycle basis.

In the V-phase, ripple current still repeatedly occurs in the same direction by carrier cycle. This generates vibration in the same direction by carrier cycle, which causes noise and vibration in carrier frequencies. FIG. 22 shows four carrier cycles as two series of carrier cycles shown in FIG. 21.

Figure 23:
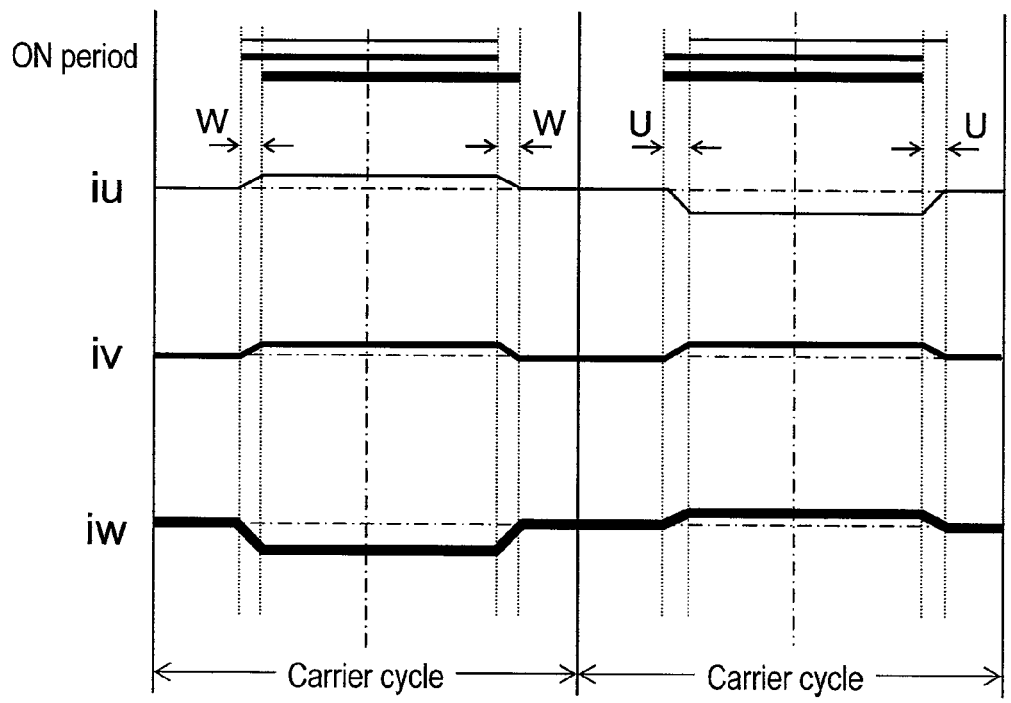
FIG. 23 shows behavior of ripple current over two carrier cycles that are formed of the left-to-right-reversed carrier cycles of FIG. 21 when current in two phases is detected on the two-carrier-cycle basis.

FIG. 23 shows the state where each of the carrier cycles on the left and the right of FIG. 21 is reversed left to right at each center. Although the behavior of the ripple current is opposite to that shown in FIG. 21, there is no difference in that current in two phases is detectable. The first carrier cycle undergoes a first correction and the second carrier cycle undergoes a second correction.

Figure 24:
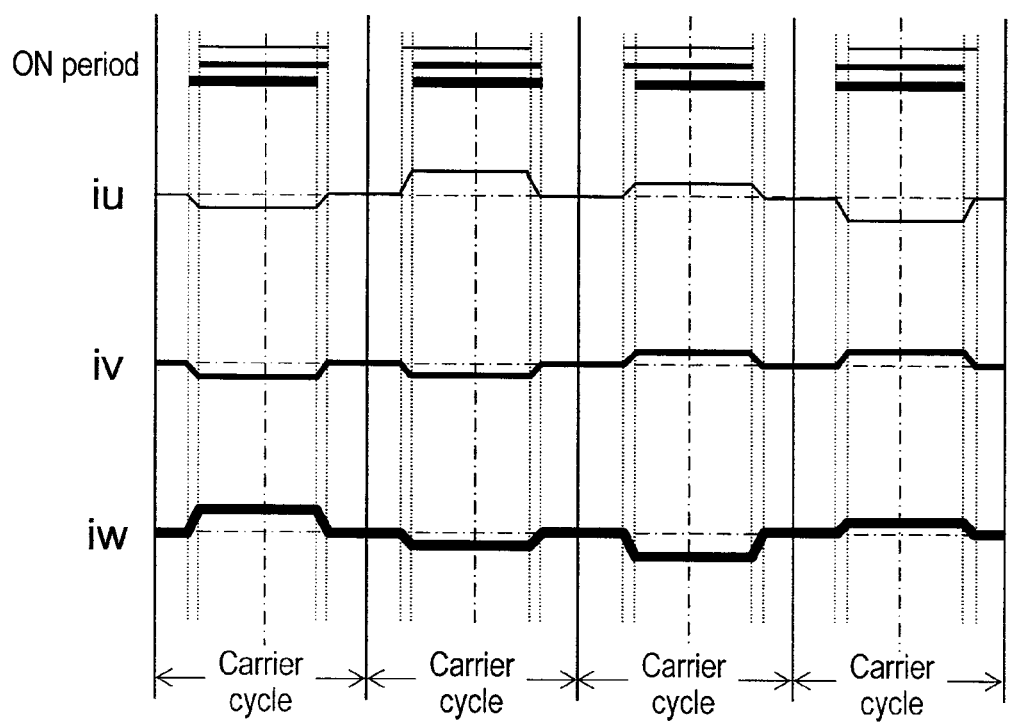
FIG. 24 shows improved behavior of the ripple current over four carrier cycles.

FIG. 24 shows behavior of the ripple current for four carrier cycles as a combination of the two cycles of FIG. 21 and the two cycles of FIG. 23. As for the ripple current of the V-phase, the repeat occurrence in the same direction is no longer observed. This suppresses noise and vibration in carrier frequencies, enhancing smooth operations with low noise and vibration. Besides, different behavior of the ripple current of each phase is repeated as a pattern on the four-carrier-cycle basis. This reduces the frequency one-fourth, contributing to smooth operations with grating noise suppressed.

Third Exemplary Embodiment

The structure of the third exemplary embodiment will be described with reference to FIGS. 25 through 29. According to the structure of the embodiment, current in two phases is detected on the four-carrier-cycle basis, i.e., one phase-current is detected on the two-carrier-cycle basis.

Figure 25:
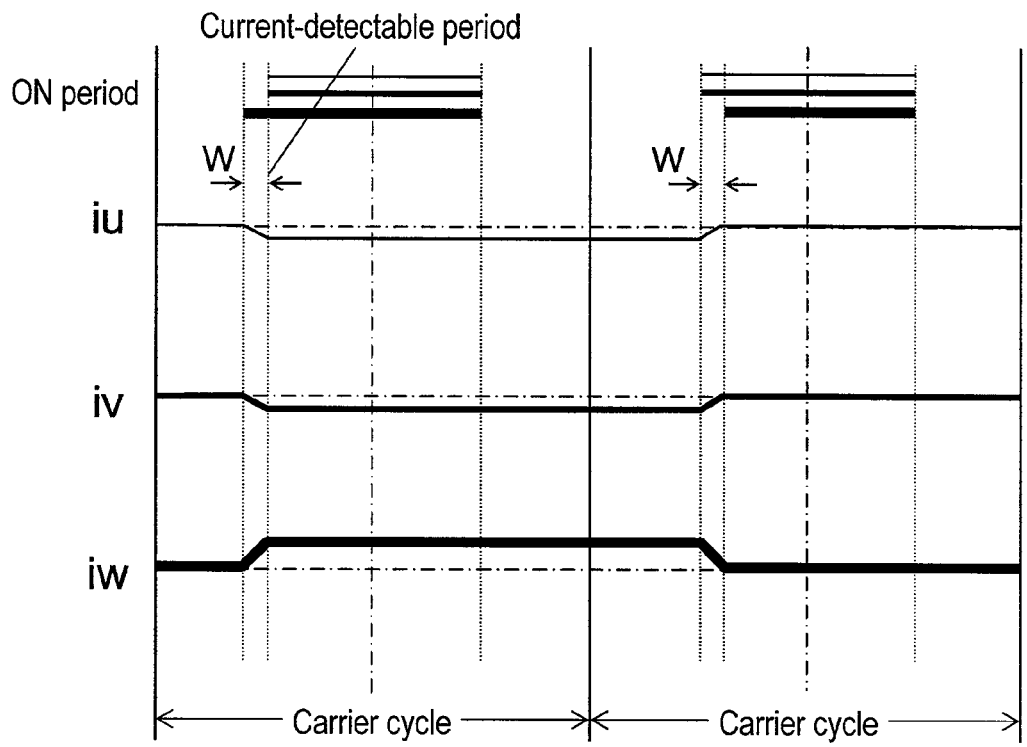
FIG. 25 shows behavior of ripple current over two carrier cycles when current in one phase is detected on the two-carrier-cycle basis in accordance with a third exemplary embodiment.

The left-side carrier cycle of FIG. 25 is so formed that time δ is added to the beginning of the ON period of the W-phase in FIG. 18. The U-phase and the V-phase have no addition. The correction above allows the current sensor to have time δ for detecting the W-phase current in the beginning of the ON period, that is, the W-phase current is detectable. U-phase current iU and V-phase current iV change in the negative direction, whereas W-phase current iW changes in the positive direction. On the other hand, the right-side carrier cycle of FIG. 25 is so formed that time δ is subtracted from the beginning of the ON period of the W-phase in FIG. 18. The subtraction cancels out the addition provided in the left-side cycle. The U-phase and the V-phase have no subtraction. The correction allows the current sensor to have time δ for detecting the W-phase current in the beginning of the ON period, that is, the W-phase current is detectable. U-phase current iU and V-phase current iV change in the positive direction, whereas W-phase current iW changes in the negative direction. That is, a negative-going ripple appears in U-phase current iU and V-phase current iV, whereas a positive-going ripple appears in the W-phase current iW over two carrier cycles. This is the first correction on the two-carrier-cycle basis.

Figure 26:
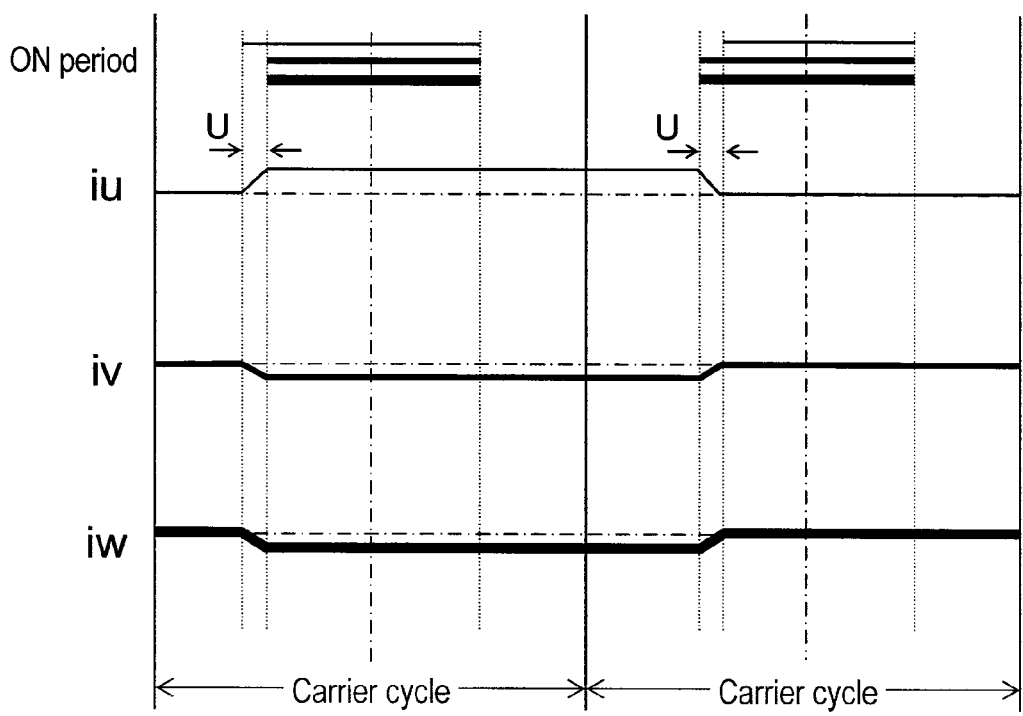
FIG. 26 shows behavior of ripple current over two carrier cycles when current in another phase is detected on the two-carrier-cycle basis.

The left-side carrier cycle of FIG. 26 is so formed that time δ is added to the beginning of the ON period of the U-phase in FIG. 18. The V-phase and the W-phase have no addition. The correction above allows the current sensor to have time δ for detecting the U-phase current in the beginning of the ON period, that is, the U-phase current is detectable. U-phase current iU changes in the positive direction, whereas V-phase current iV and W-phase current iW change in the negative direction. On the other hand, the right-side carrier cycle of FIG. 26 is so formed that time δ is subtracted from the beginning of the ON period of the U-phase in FIG. 18. The subtraction cancels out the addition provided in the left-side cycle. The V-phase and the W-phase have no subtraction. The correction allows the current sensor to have time δ for detecting the U-phase current in the beginning of the ON period, that is, the U-phase current is detectable. U-phase current iU changes in the negative direction, whereas V-phase current iV and W-phase current iW change in the positive direction. That is, a positive-going ripple appears in U-phase current iU, whereas a negative-going ripple appears in V-phase current IV and W-phase current iW over two carrier cycles. This is the second correction on the two-carrier-cycle basis.

Figure 27:
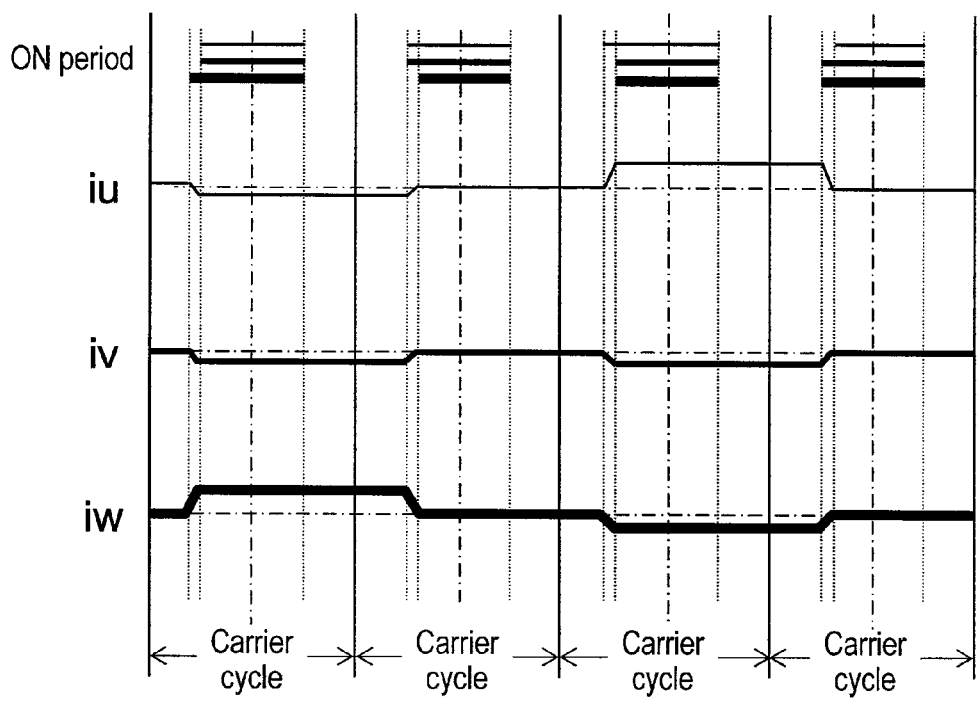
FIG. 27 shows behavior of ripple current over four carrier cycles when current in two phases is detected on the four-carrier-cycle basis.

Through the correction above, current in two phases is detected on the four-carrier-cycle basis. FIG. 27 shows behavior of the ripple current for four carrier cycles as a combination of the two cycles of FIG. 25 and the two cycles of FIG. 26. As is in FIG. 20, the behavior of the ripple current in the U-phase and W-phase in the right-side cycle is opposite to that in the left-side cycle. Compared to the state in FIG. 20, change in the ripple current of the U-phase and the W-phase is smaller. Besides, the change cycle of the current in FIG. 20 takes one carrier, whereas the change cycle of the current in FIG. 26 takes two carriers. These advantages further contribute to smooth operations with low noise and vibration.

In the V-phase, ripple current still repeatedly occurs in the same direction by two carrier-cycles. This generates vibration in the same direction by two carrier-cycles.

Figure 28:
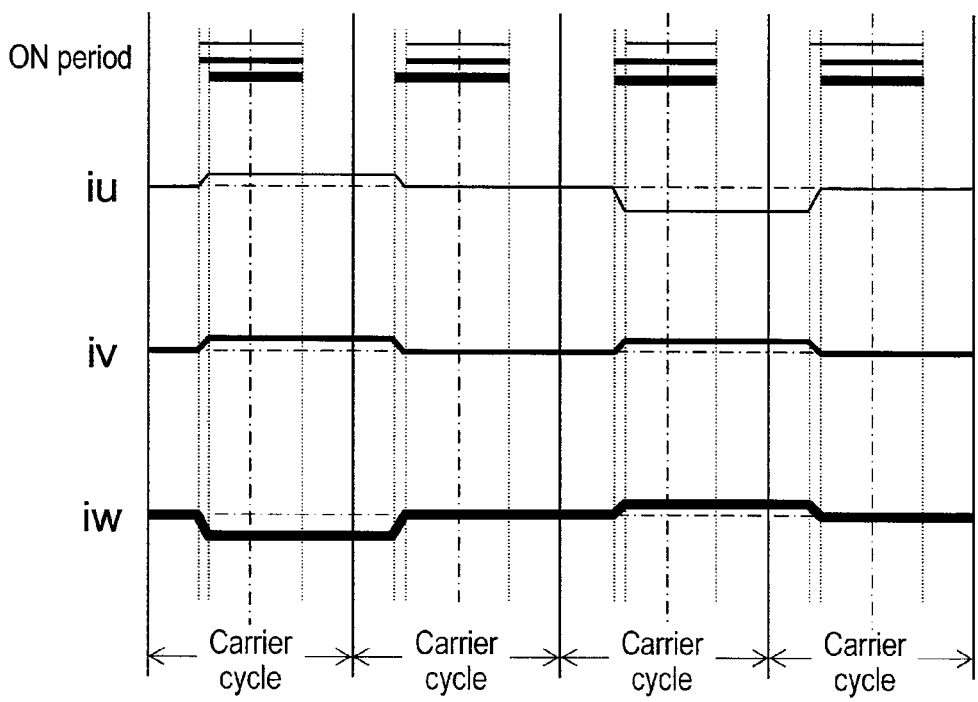
FIG. 28 shows behavior of ripple current over four carrier cycles when current in two phases is detected on the basis of cycle-reversed four carrier-cycles.

FIG. 28 shows four carrier cycles as a combination of FIG. 25 and FIG. 26; specifically, the two carrier cycles of FIG. 25, which are reversed left to right, are connected to the two carrier cycles of FIG. 26 that are also reversed left to right. Although the behavior of the ripple current in each phase is opposite to that shown in FIG. 25 and FIG. 26, there is no difference in that current in two phases is detectable. However, as is in FIG. 27, the ripple current in the V-phase repeatedly occurs in the same direction on the two-carrier-cycle basis. In this case, the correction applied to the first and the second carrier cycles is the first correction on the two-carrier-cycle basis; and the correction applied to the third and the fourth carrier cycles is the second correction on the two-carrier-cycle basis.

Figure 29:
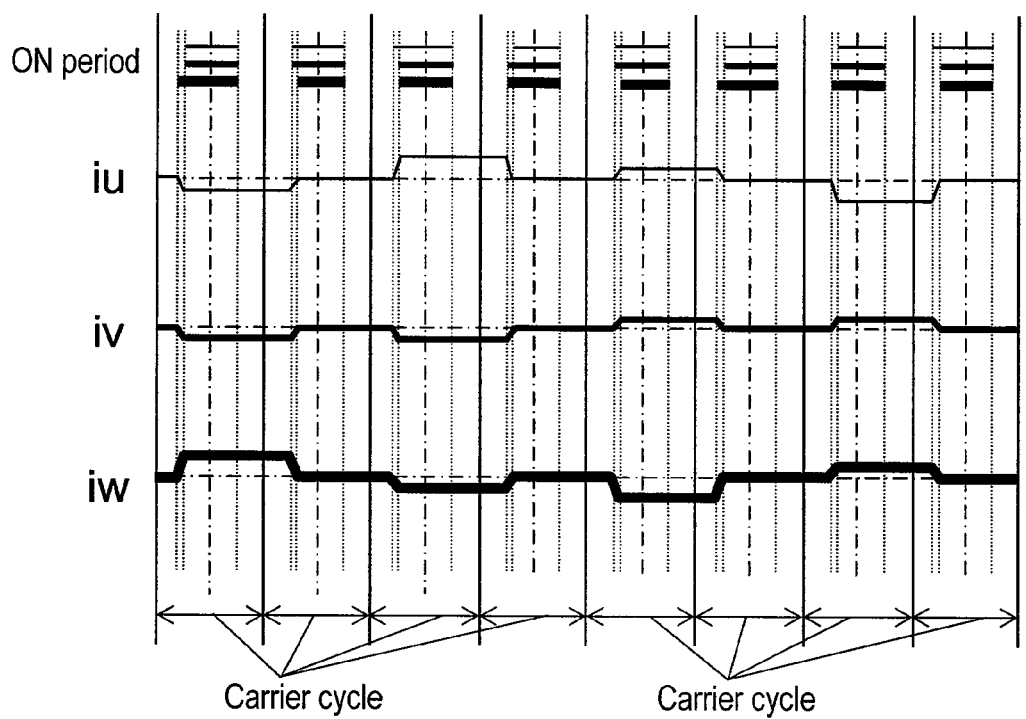
FIG. 29 shows improved behavior of ripple current over eight carrier cycles.

FIG. 29 shows behavior of the ripple current for eight carrier cycles as a combination of the four cycles of FIG. 27 and the four cycles of FIG. 28. As for the ripple current of the V-phase, unlike in each state of FIGS. 27 and 28, the repeat occurrence in the same direction is no longer observed. This suppresses noise and vibration on the two-carrier-cycle basis, enhancing smooth operations with low noise and vibration. Besides, different behavior of the ripple current of each phase is repeated as a pattern on the eight-carrier-cycle basis. This reduces the frequency one-eighth, contributing to smooth operations with grating noise suppressed.

As another possibility arrangement in FIG. 29, the fifth and the sixth carrier cycles may follow the second carrier cycle and the third and the fourth carrier cycles may follow the eighth carrier cycle. The arrangement brings a ripple current close to that with a similar level in change, enhancing the canceling effect. In this case, current in two phases is detected on eight-carrier-cycle basis: the W-phase current in the first through the fourth carrier cycles, the U-phase current in the fifth through the eighth carrier cycles. The first and the second carrier cycles undergo the first correction on the two-carrier-cycle basis; the fifth and the sixth (as the original order) carrier cycles undergo the second correction on the two-carrier-cycle basis; the seventh and the eighth (as the original order) carrier cycles undergo the first correction on the two-carrier-cycle basis; and the third and the fourth (as the original order) carrier cycles undergo the second correction on the two-carrier-cycle basis.

Fourth Exemplary Embodiment

Figure 30:
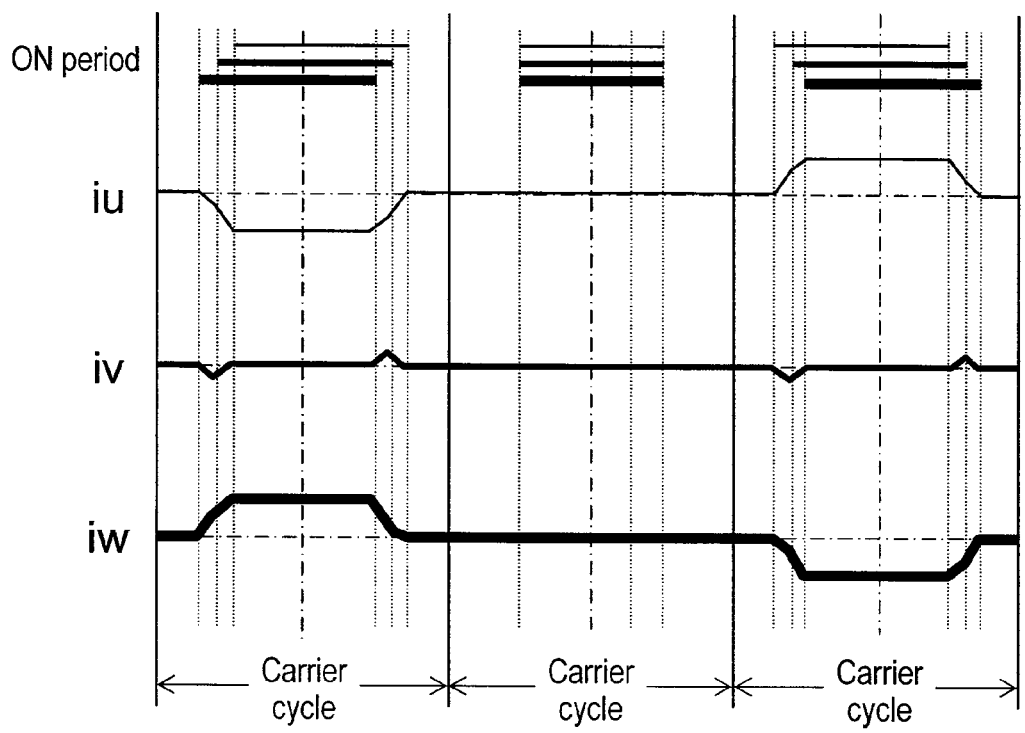
FIG. 30 shows improved behavior of ripple current over two carrier cycles in accordance with a four exemplary embodiment.

FIG. 30 shows improved behavior of each phase current after correction on the ON-period in accordance with the fourth exemplary embodiment. The carrier cycles of FIG. 30 are so formed that a carrier cycle with no correction (i.e., without consideration of the PWM) is inserted between the left-side carrier cycle (with the first correction) of FIG. 20 and the right-side carrier cycle (with the second correction). Having the ripple-free carrier cycle brings decrease in carrier frequency and energy per unit time. This contributes to smooth operations, with grating noise further suppressed than the state in FIG. 20.

A carrier cycle with no correction is not necessarily positioned in the middle; it can follow the right-side carrier cycle. There is no restraint on the position and the number of a carrier cycle to be added.

Figure 31:
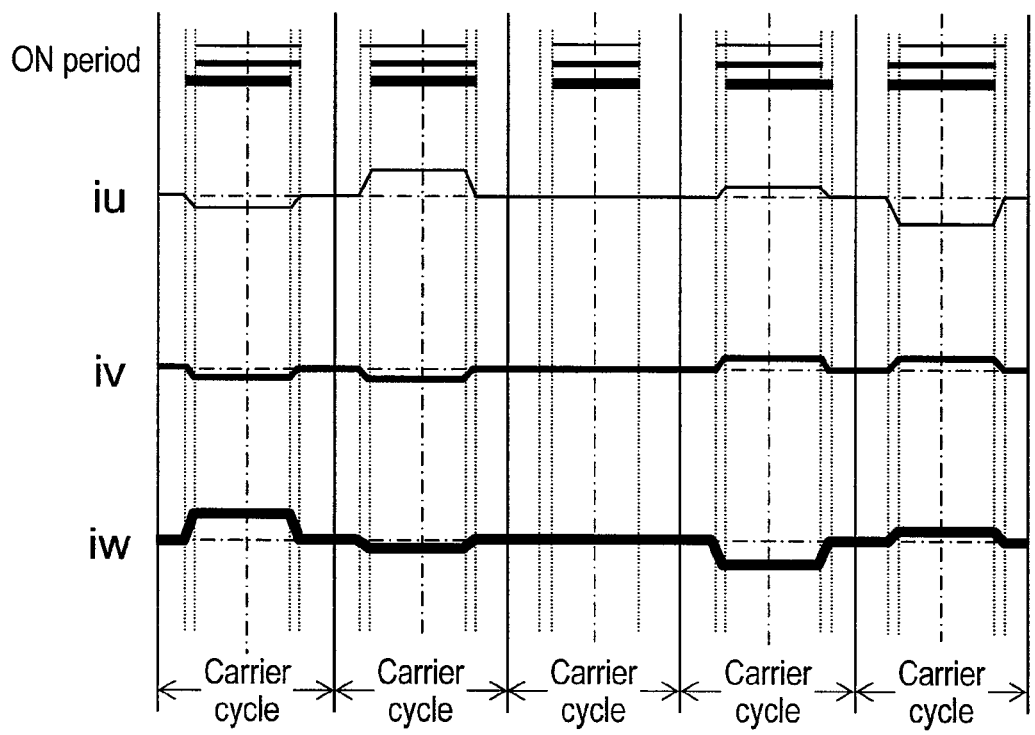
FIG. 31 shows improved behavior of the ripple current over five carrier cycles.

FIG. 31 shows the carrier cycles where a carrier cycle with no correction is added in the middle of the carrier cycles of FIG. 24. Specifically, a carrier cycle with no correction (i.e., without consideration of the PWM) is inserted between the two carrier cycles of FIG. 21 and the two carrier cycles of FIG. 23. Having the ripple-free carrier cycle improves the state of FIG. 24, thereby further suppressing noise and vibration.

Figure 32:
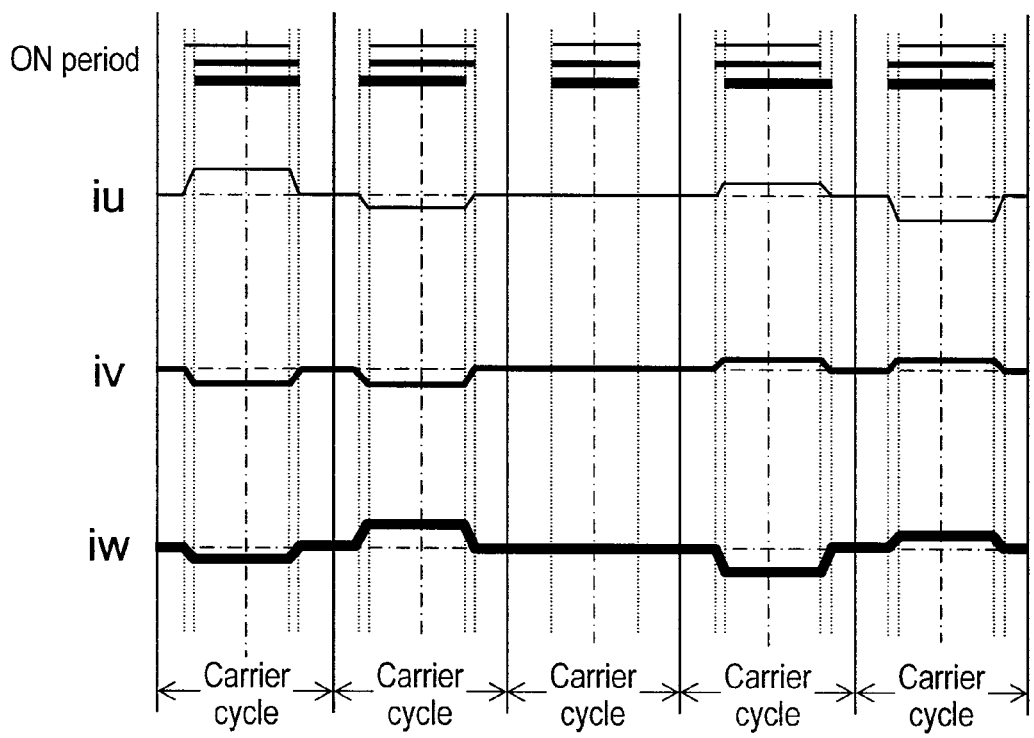
FIG. 32 shows improved behavior of the ripple current over five carrier cycles, with the cycle order changed from that of FIG. 31.

FIG. 32 shows improved behavior of the ripple current in the five carrier cycles where the two carrier cycles from the left of FIG. 31 is reversed left to right. In the five carrier cycles with a carrier cycle with no correction inserted in the middle, each ripple current of the U-phase and the W-phase changes its polarity by carrier cycle, thereby further improving the state of FIG. 31.

Figure 33:
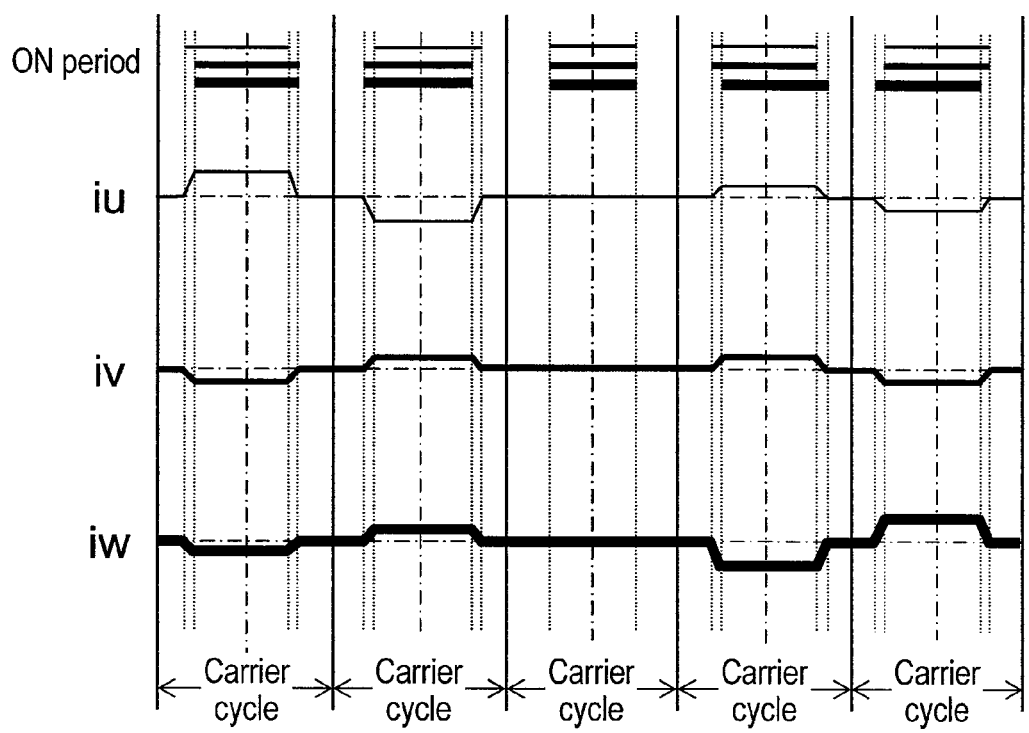
FIG. 33 shows improved behavior of the ripple current over five carrier cycles, with the cycle order changed from that of FIG. 32.

FIG. 33 shows another improved behavior of the ripple current in the five carrier cycles where the second and the fourth carrier cycles from the left of FIG. 32 are exchanged. Like in the state of FIG. 32, each ripple current of the U-phase and the W-phase changes its polarity by carrier cycle. Besides, the arrangement brings a ripple current close to that with a similar level in change, enhancing the canceling effect. The correction method of the embodiment is similar to that described in the third embodiment in current detection in two different phases on the four-carrier-cycle basis; the two corrections have difference in position of the carrier cycles in which phase current is detected. In the correction of the embodiment, the U-phase current is detected in the first and the second carrier cycles and the W-phase current is detected in the fourth and the fifth carrier cycles. The first carrier cycle undergoes the first correction; the second carrier cycle undergoes the second correction; the fourth carrier cycle undergoes to the first correction; and the fifth carrier cycle undergoes to the second correction. In this case, the correction applied to the first and the second carrier cycles may be regarded as the first correction on the two-carrier-cycle basis, and similarly, the correction applied to the fourth and the fifth carrier cycles may be regarded as the second correction on the two-carrier-cycles basis.

A carrier cycle with no correction is not necessarily positioned in the middle; it can follow the right-side carrier cycle. There is no restraint on the position and the number of a carrier cycle to be added.

Fifth Exemplary Embodiment

In many cases, phase current is not detected in a carrier cycle with no correction that operates on the PWM with a small modulation degree. However, FIG. 12 shows the case where one phase-current is detectable in phases of 30° and 90°. The current detection, even in one phase, can contribute to improved accuracy in detecting the position of the magnet rotor.

Sixth Exemplary Embodiment

At the start operations of the motor, position detecting of the magnet rotor is not easy because of low revolution speed and low induced voltage. In a short-period operation, the effect of noise and vibration is not serious. Under the condition above, preferably, current in two phases should be detected by carrier cycle for the position detecting, with no use of the correction described from the second through the fifth exemplary embodiments. The method above allows the motor to be operated without performance degradation on starting. For example, it is suitable for the operation in which the revolution speed is rapidly increased to approx. 30 Hz for obtaining excellent starting-up performance and then settled down to 20 Hz as normal operation.

Seventh Exemplary Embodiment

In the current detection of second exemplary embodiment, current in two phases is detected on the two-carrier-cycle basis—one phase-current-detection by carrier cycle. In the current detection of the third exemplary embodiment, current in two phases is detected on the four-carrier-cycle basis. According to the current detection of the fourth exemplary embodiment, in many cases, phase current is not detected in a carrier cycle having no correction. To address the inconveniency, current detection in some carrier cycles should be carried out with the use of the phase current that is detected in a different carrier cycle.

The phase-current detection is therefore effective in low-revolution speed operation where a revolution cycle is sufficiently great in length with respect to a carrier cycle. Under the condition, phase-current detection by carrier cycle has little effect on position detecting of the magnet rotor. For example, a revolution speed that corresponds to the condition is approx. 20 Hz with a maximum revolution speed of 120 Hz, a carrier cycle of 75 μS.

Eighth Exemplary Embodiment

In FIG. 14A, time α and time β represent the period in which current flows in current sensor 6 on the PWM driving, that is, the period in which the PWM driving increases or decreases current fed from battery 1. As is shown in the case with the modulation degree of 10% (FIG. 12) and the case with the modulation degree of 5% (FIG. 13), time α and time β are shorter than time δ in low-output operations.

On the other hand, as is shown in FIG. 14C, when correction is applied for current detection, the period in which current flows in current sensor 6 is longer than time δ. The behavior of ripple current after correction becomes noticeable in increase/decrease of current under the PWM driving, thereby increasing noise and vibration. In contrast, as is shown in the case with the modulation degree of 100% (FIG. 10) and the case with the modulation degree of 50% (FIG. 11), the behavior of ripple current after correction becomes unnoticeable in increase/decrease of current under the PWM driving, thereby suppressing noise and vibration in high-output operations. The correction of the present invention is therefore highly effective in low-output operations.

Ninth Exemplary Embodiment

Figure 34:
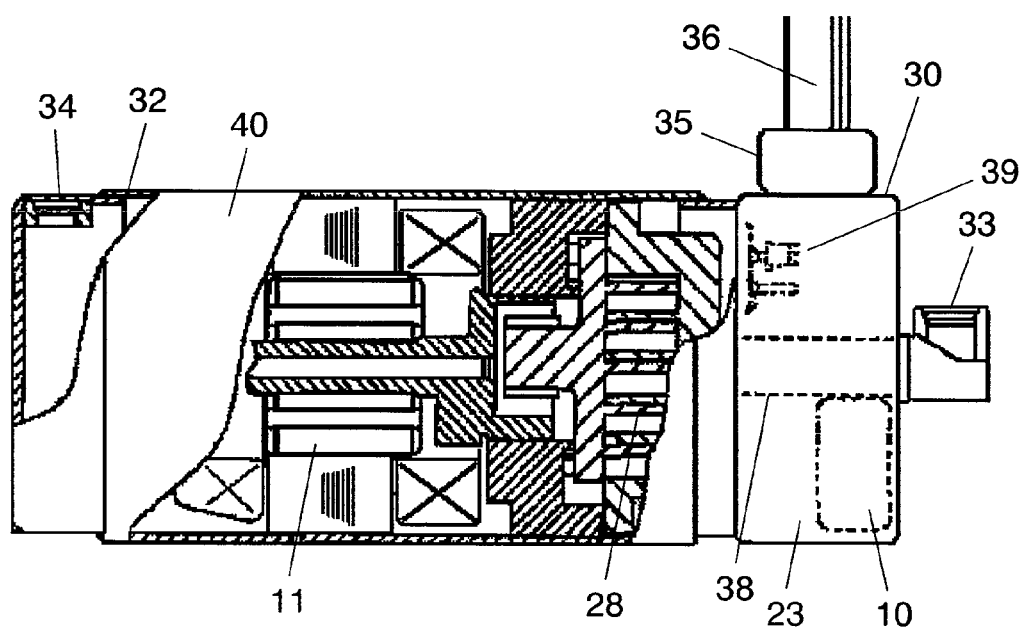
FIG. 34 is a section view of an inverter-integrated electric compressor in accordance with a ninth exemplary embodiment.
Figure 38:
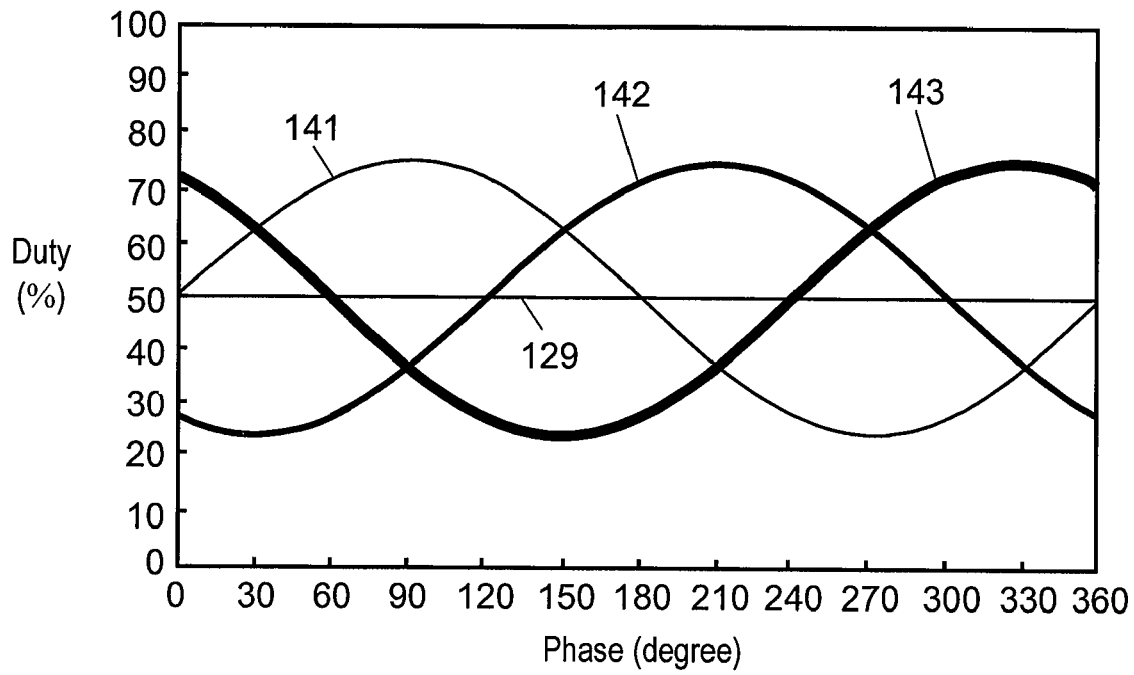
FIG. 38 shows modulated waves in each phase in conventional three-phase modulation with a maximum modulation degree of 50%.
Figure 39:
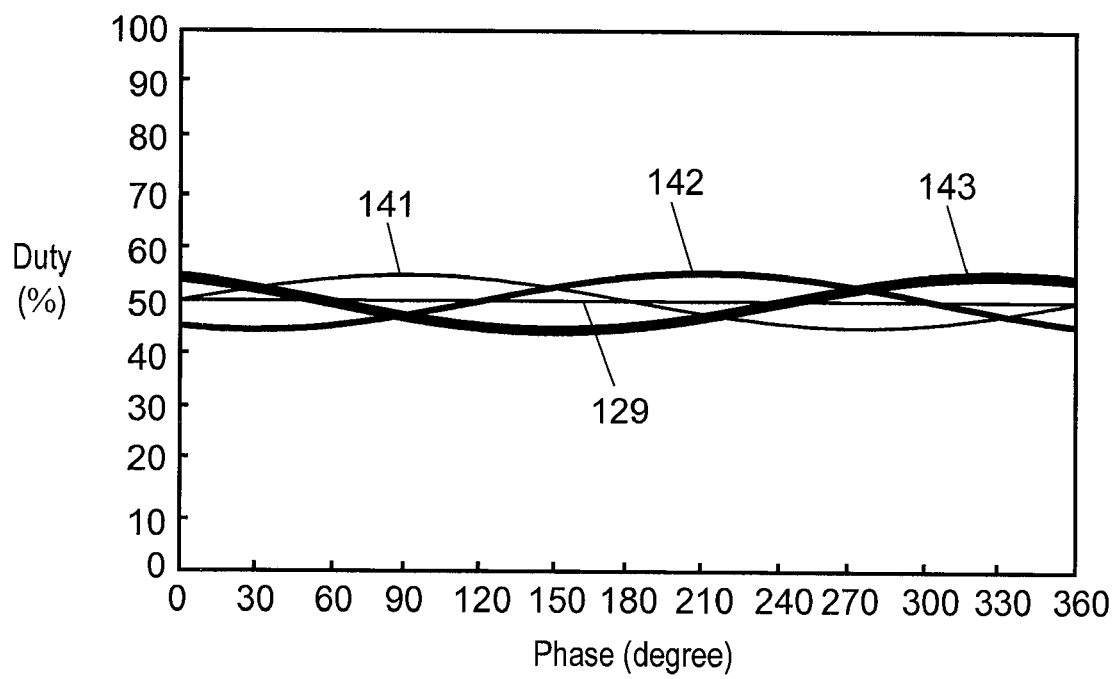
FIG. 39 shows modulated waves in each phase in conventional three-phase modulation with a maximum modulation degree of 10% in the inverter device.
Figure 40:
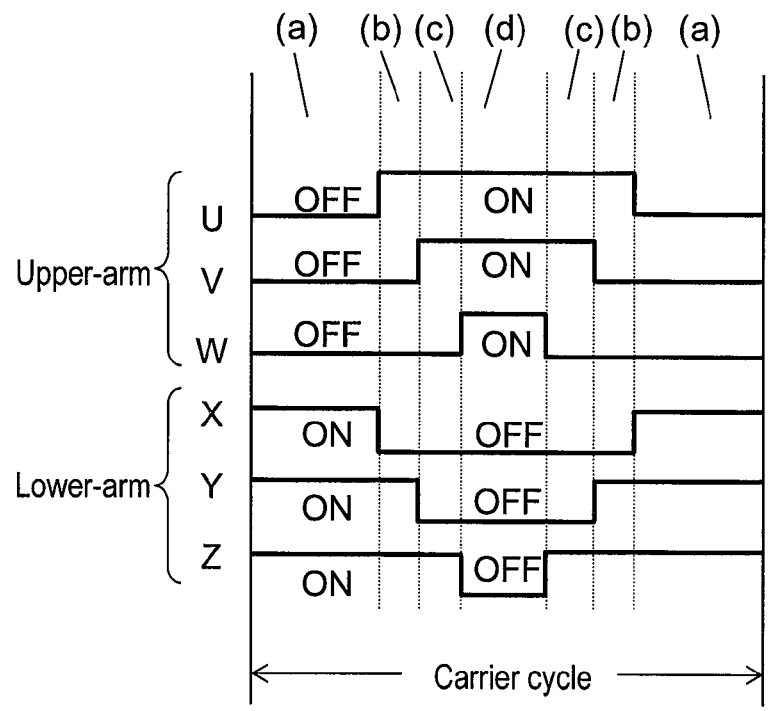
FIG. 40 is a timing chart illustrating conventional phase-current detection.
Figure 41:
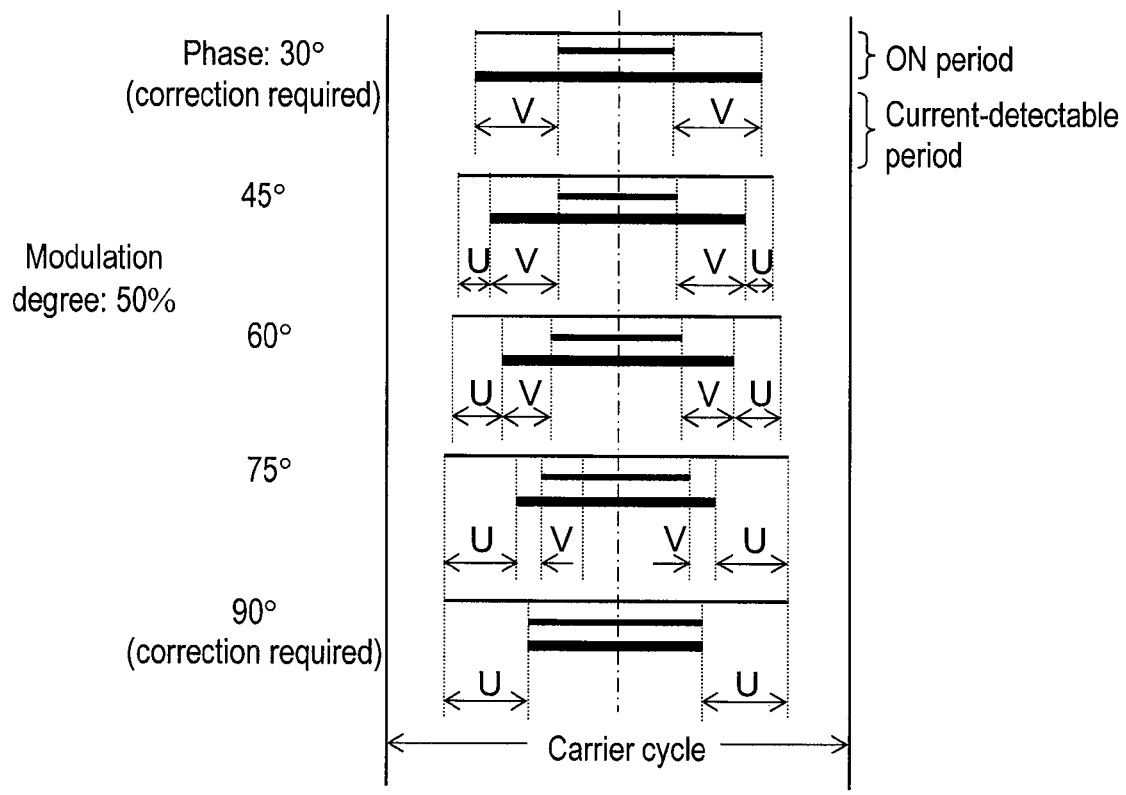
FIG. 41 shows a state of the upper-arm switching elements in each phase in conventional three-phase modulation with a maximum modulation degree of 50%.
Figure 42:
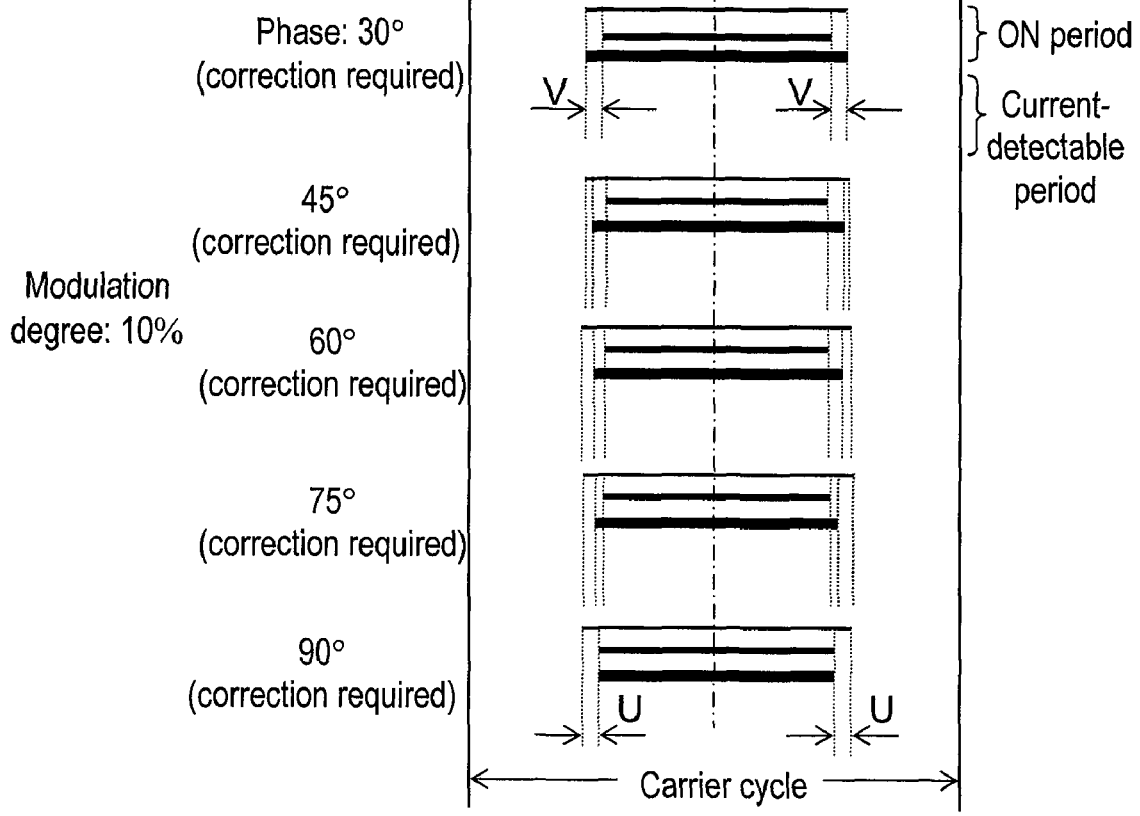
FIG. 42 shows a state of the upper-arm switching elements in each phase in the conventional three-phase modulation with a maximum modulation degree of 10%.
Figure 43A:
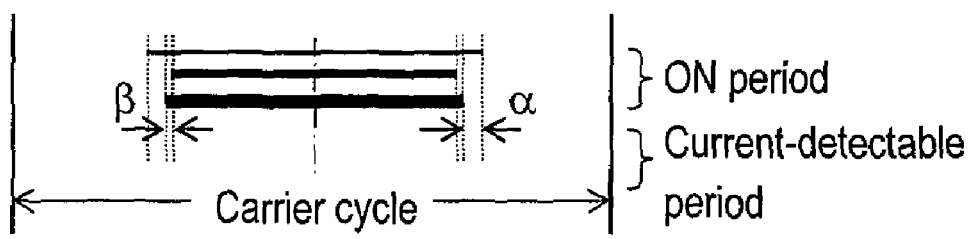
FIG. 43A illustrates a conventional method for detecting phase current in three-phase modulation.
Figure 43B:
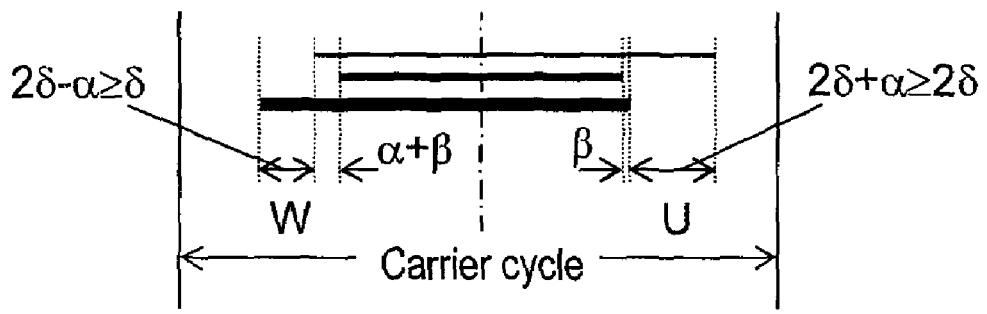
FIG. 43B shows a state as a result of correction applied to the state of FIG. 43A.
Figure 43C:
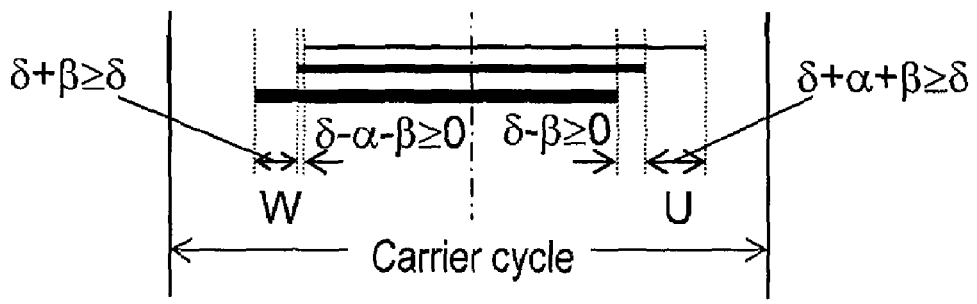
FIG. 43C shows a state as a result of correction applied to the state of FIG. 43A.
Figure 44:
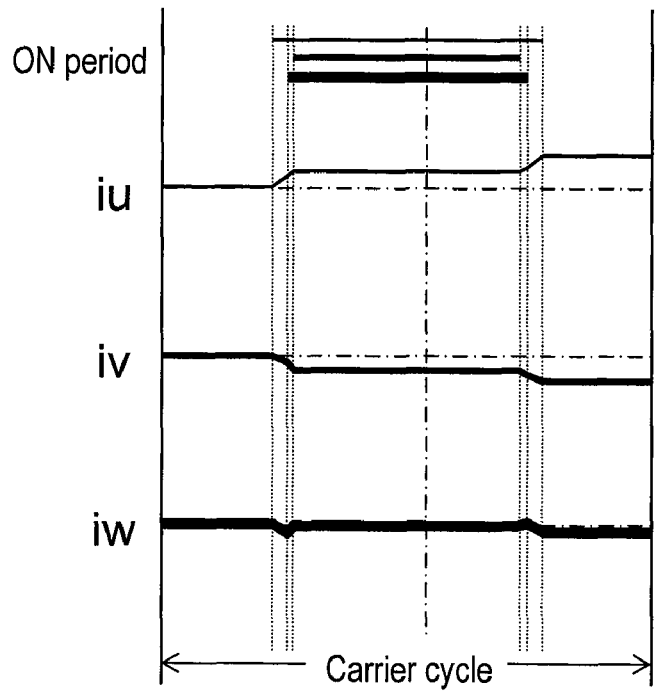
FIG. 44 shows behavior of each phase current in a carrier cycle without conventional correction for phase-current detection.
Figure 45:
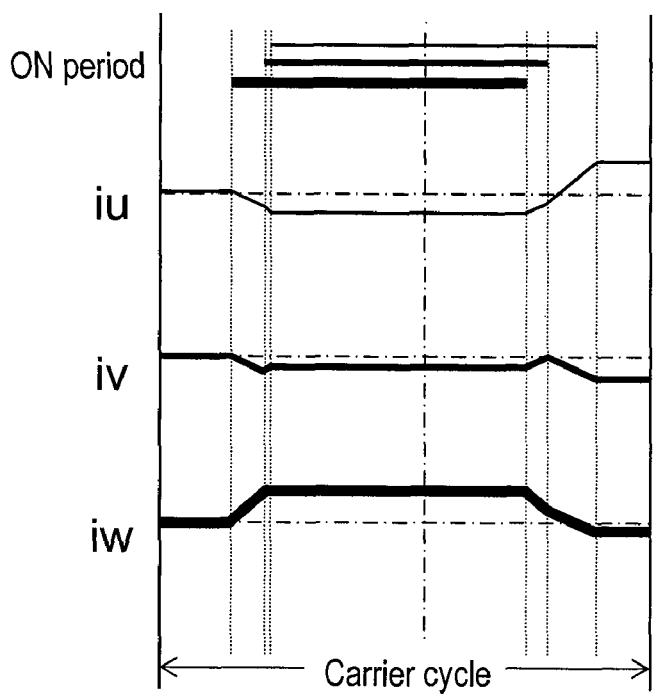
FIG. 45 shows behavior of each phase current in a carrier cycle with conventional correction for phase-current detection.

In FIG. 34, inverter device 23 is attached on the right side of electric compressor 40. Metal housing 32 accommodates compression mechanism 28, motor 11 and the like. Refrigerant, which is fed through inlet 33, is compressed by compression mechanism 28 (a scroll mechanism is employed here) driven by motor 11. The compressed refrigerant cools down motor 11 while passing through motor 11 and goes out of outlet 34.

Inverter device 23 has case 30 for being easily attached with electric compressor 40. Inverter circuit 10 as a heat source is cooled down by low pressure refrigerant via low pressure pipe 38. Terminal 39, which is connected to the winding of motor 11 in the interior of electric compressor 40, is connected to the output section of inverter circuit 10. Connecting line 36, which is fixed to inverter device 23 by holding section 35, contains a power-source line connected to battery 1 and a signal line connected to an air-conditioning controller (not shown) for sending a revolution speed signal.

Such an inverter-integrated electric compressor needs compact and vibration-proof inverter device 23. Besides, air-conditioning operations need a quiet inverter device because of its long-hours operations. The requirements above will be satisfied with the structure of the embodiment that provides current detection by a single current-sensor, such as a shunt resistor, with low noise and vibration.

Tenth Exemplary Embodiment

FIG. 35 is a circuit diagram showing the structure where an inverter device is connected to a motor via an input/output isolating transformer in accordance with a tenth exemplary embodiment. Coils 51, 52 and 53 of transformer 50 receive output of inverter device 23. Coils 54, 55 and 56 are connected to motor 11. With the structure above, inverter device 23 supplies motor 11 with AC current under an electrically isolated condition. Besides, the inverter device detects phase current to be fed into the transformer, and at the same time, suppresses noise and vibration in the transformer caused by ripple current. The structure described above is equally applicable to combination of a single-phase inverter device, a single-phase transformer and electric devices as a load.

Eleventh Exemplary Embodiment

FIG. 36 is a diagrammatic illustration of a vehicle employing the inverter device in accordance with an eleventh exemplary embodiment. The inverter device is structured integral to an electric compressor as described in the ninth exemplary embodiment. Inverter-integrated electric compressor 61, outdoor heat exchanger 63 and outdoor fan 62 are accommodated in engine room 71 situated in front of vehicle 60. Indoor fan 65, indoor heat exchanger 67 and air-conditioning controller 64 are disposed in interior 72 of vehicle 60. Body 68 forms engine room 71 and interior 72. Captured through air inlet 66, outside air undergoes heat exchange in indoor heat exchanger 67 and then comes into the interior of the vehicle.

Outdoor heat exchanger 63 and indoor heat exchanger 67 are connected with electric compressor 61. Rear wheels 69 as driving wheels and front wheels 70 as steering wheels support body 68.

Vehicles, in particular, electric vehicles and hybrid vehicles need a compact and lightweight air conditioner in terms of attainment of reliable driving performance and constraints on the installation space. Under the circumstances, it has become a critical challenge for an electric compressor in an effort of reducing its size and weight so as to be disposed in the space-limited motor room, engine room or other narrow spaces. Besides, not only quiet operations with low noise and vibration but also vibration-proof structure have been desired for such a vehicle.

As described in the embodiments, the inverter device of the present invention has a simple structure having a single current sensor, such as a shunt resistor, providing a compact and vibration-proof structure with low noise and vibration. The inverter device of the present invention is therefore suitable for the use in vehicles.

The structure described in the embodiments is particularly effective in operations at low revolution speed (approx. 20 Hz) where noise caused by ripple current stands out against the suppressed mechanical noise. In a case having successive several carrier cycles, the change in phases is kept small and the ON-period (ON-duty) is determined to be the same. Although the structure of the present invention employs a battery for DC power source, it is not limited thereto. For example, a DC power source, which is obtained by rectifying commercial AC power source, can be effectively used. Although a sensorless DC brushless motor is employed for motor 11 in the structure, it is not limited thereto; motor 11 may be a reluctance motor, an induction motor or the like. Furthermore, the structure is applicable to a driving system other than sine wave driving. The structure of the present invention is particularly effective in three-phase modulation where a current waveform exhibits a smooth curve rather than in two-phase modulation.

INDUSTRIAL APPLICABILITY

As described above, the structure of the present invention provides a compact and lightweight inverter device. Employing a single current sensor, the device offers reliable operations with noise and vibration minimized. The structure is therefore quite suitable for a motor-driving device that is used for various products in consumer use and industrial use.

The invention claimed is:

1. An inverter device comprising:
    an inverter circuit having upper-arm switching elements connected on a positive side of a DC power source and lower-arm switching elements connected on a negative side of the DC power source;
    a current sensor that detects current between the DC power source and the inverter circuit; and
    a control circuit that controls the inverter circuit so that the inverter circuit outputs AC current to a motor by a PWM driving,
    wherein, the control circuit provides a carrier cycle with a first correction and provides the successive cycle with a second correction on a basis of one carrier cycle or two carrier cycles so that the current sensor can detect phase current of the motor, and a ripple current caused by the first correction and a ripple current caused by the second correction are opposite in polarity.

2. The inverter device of claim 1, wherein the current sensor detects current in two different phases of the motor on a basis of two carrier cycles.

3. The inverter device of claim 1, wherein the current sensor detects current in two different phases of the motor on a basis of four carrier cycles.

4. The inverter device of claim 1, wherein the control circuit makes an arrangement of carrier cycles in a manner that a carrier cycle without the first correction and the second correction is placed adjacent to a carrier cycle with the first correction or the second correction.

5. The inverter device of claim 4, wherein the current sensor detects phase current when phase-current detection is possible in the carrier cycle without the first correction and the second correction.

6. The inverter device of claim 1, wherein the phase current in two different phases is detected on a basis of the carrier cycle in start-up operations of the motor.

7. The inverter device of claim 1, wherein the first correction and the second correction are carried out when the motor operates at low revolution speed.

8. The inverter device of claim 1, wherein the first correction and the second correction are carried out when a low output is fed to the motor.

9. The inverter device according to claim 1, the inverter device used in a structure where an input/output isolating transformer is disposed between the AC current and the motor.

10. An electric compressor comprising:
    a compression mechanism;
    a motor configured to drive the compression mechanism; and
    an inverter device having:
        an inverter circuit having upper-arm switching elements connected on a positive side of a DC power source and lower-arm switching elements connected on a negative side of the DC power source;
        a current sensor that detects current between the DC power source and the inverter circuit; and
        a control circuit that controls the inverter circuit by a PWM driving so that the inverter circuit outputs AC current to the motor,
    wherein the control circuit provides a carrier cycle with a first correction and provides the successive cycle with a second correction on a basis of one carrier cycle or two carrier cycles so that the current sensor can detect phase current of the motor, and a ripple current caused by the first correction and a ripple current caused by the second correction are opposite in polarity.

11. A vehicle comprising:
    a body forming an interior and at least one of an engine room and a motor room;
    a wheel supporting the body;
    an electric compressor having;
        a compression mechanism;
        a motor configured to drive the compression mechanism; and
        an inverter device including:
            an inverter circuit having upper-arm switching elements connected on a positive side of a DC power source and lower-arm switching elements connected on a negative side of the DC power source;
            a current sensor that detects current between the DC power source and the inverter circuit; and
            a control circuit that controls the inverter circuit by a PWM driving so that the inverter circuit outputs AC current to the motor, wherein the control circuit provides a carrier cycle with a first correction and provides the successive cycle with a second correction on a basis of one carrier cycle or two carrier cycles so that the current sensor can detect phase current of the motor, and a ripple current caused by the first correction and a ripple current caused by the second correction are opposite in polarity;

an outdoor heat exchanger connected with the electric compressor and disposed in the engine room; and an indoor heat exchanger connected with the electric compressor and disposed in the interior.

* * * * *